US010322946B2

(12) United States Patent
Gantenbein et al.

(10) Patent No.: US 10,322,946 B2
(45) Date of Patent: Jun. 18, 2019

(54) HYDROPHOBISED CALCIUM CARBONATE PARTICLES

(75) Inventors: Daniel Gantenbein, Elnesvagen (NO); Joachim Schoelkopf, Killwangen (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/127,725

(22) PCT Filed: Jul. 10, 2012

(86) PCT No.: PCT/EP2012/063461
§ 371 (c)(1),
(2), (4) Date: Feb. 28, 2014

(87) PCT Pub. No.: WO2013/007717
PCT Pub. Date: Jan. 17, 2013

(65) Prior Publication Data
US 2015/0044127 A1    Feb. 12, 2015

Related U.S. Application Data

(60) Provisional application No. 61/508,730, filed on Jul. 18, 2011.

(30) Foreign Application Priority Data

Jul. 11, 2011    (EP) .................... 11173471

(51) Int. Cl.
*C02F 1/28*    (2006.01)
*B01J 20/28*   (2006.01)
(Continued)

(52) U.S. Cl.
CPC ......... *C02F 1/288* (2013.01); *B01J 20/28016* (2013.01); *B01J 20/28059* (2013.01);
(Continued)

(58) Field of Classification Search
None
See application file for complete search history.

(56) References Cited

U.S. PATENT DOCUMENTS 4,460,605 A    7/1984 Petrik et al.
5,411,639 A    5/1995 Kurrle
(Continued)

FOREIGN PATENT DOCUMENTS

CA    2205277 A1    11/1997
CN    101627160 A    1/2010
(Continued)

OTHER PUBLICATIONS

Hu et al. (Ind. Eng. Chem. Res., 2010, 49, 5625-5630).*
(Continued)

*Primary Examiner* — Clare M Perrin
(74) *Attorney, Agent, or Firm* — Amster, Rothstein & Ebenstein LLP

(57) ABSTRACT

The present invention relates to a process for the reduction of pitch in an aqueous medium generated in a papermaking or pulping process, comprising the following steps: a) providing an aqueous medium comprising pitch generated in a papermaking or pulping process; b) providing a ground calcium carbonate and/or a precipitated calcium carbonate; c) providing a hydrophobizing agent selected from an aliphatic carboxylic acid having between 5 and 24 carbon atoms; d) contacting the ground calcium carbonate and/or the precipitated calcium carbonate of step b) with the hydrophobizing agent of step c) for obtaining a hydrophobized ground calcium carbonate and/or a hydrophobized precipitated calcium carbonate; and e) contacting the aqueous medium provided in step a) with the hydrophobized ground calcium carbonate and/or the hydrophobized precipitated calcium carbonate obtained in step d), to the use of a hydrophobized ground calcium carbonate and/or a hydro-
(Continued)

phobized ground calcium carbonate for reducing the amount of pitch in an aqueous medium as well as to a hydrophobized ground calcium carbonate and/or a hydrophobized ground calcium carbonate and a composite of hydrophobized ground calcium carbonate and/or hydrophobized ground calcium carbonate and pitch.

27 Claims, 5 Drawing Sheets

(51) Int. Cl.
*B01J 20/32* (2006.01)
*D21H 21/02* (2006.01)
*D21C 9/08* (2006.01)
C02F 103/28 (2006.01)
C01B 5/00 (2006.01)
D21H 17/67 (2006.01)
D21H 17/69 (2006.01)

(52) U.S. Cl.
CPC ........... *B01J 20/3244* (2013.01); *C02F 1/281* (2013.01); *C02F 1/285* (2013.01); *D21C 9/08* (2013.01); *D21H 21/02* (2013.01); B01J 20/28085 (2013.01); C01B 5/00 (2013.01); C02F 2103/28 (2013.01); D21H 17/675 (2013.01); D21H 17/69 (2013.01)

(56) References Cited

U.S. PATENT DOCUMENTS

| | | | |
|---|---|---|---|
| 5,527,430 | A | 6/1996 | Gill |
| 5,626,720 | A | 5/1997 | Hassler |
| 5,936,024 | A * | 8/1999 | Ling .......................... C08J 3/091 162/199 |
| 6,051,160 | A | 4/2000 | Hlivka et al. |
| 6,153,049 | A | 11/2000 | Croft |
| 6,210,526 | B1 * | 4/2001 | Pohlen ..................... D21C 5/02 162/199 |
| 2003/0096143 | A1 | 5/2003 | Lasmarias et al. |
| 2004/0231816 | A1 | 11/2004 | Steeg et al. |
| 2007/0158039 | A1 * | 7/2007 | Rosencrance et al. ............ 162/5 |
| 2008/0022901 | A1 * | 1/2008 | Buri et al. .................... 106/471 |
| 2008/0087396 | A1 | 4/2008 | Deng et al. |
| 2009/0308553 | A1 | 12/2009 | Souzy et al. |
| 2010/0133195 | A1 * | 6/2010 | Gane et al. ................... 210/667 |
| 2011/0094695 | A1 | 4/2011 | Jiang et al. |
| 2013/0192784 | A1 * | 8/2013 | Buri ........................ C09C 1/021 162/181.2 |

FOREIGN PATENT DOCUMENTS

| | | |
|---|---|---|
| CN | 101679077 A | 3/2010 |
| EP | 0074014 A1 | 8/1982 |
| EP | 0134763 A1 | 7/1985 |
| EP | 0358996 A2 | 3/1990 |
| EP | 0586755 A1 | 3/1994 |
| EP | 1950342 A1 | 7/2008 |
| EP | 1975310 A1 | 10/2008 |
| FR | 2900411 A1 | 11/2007 |
| JP | 2010521595 A | 6/2010 |
| WO | 9805819 A1 | 2/1998 |
| WO | 03085199 A2 | 10/2003 |
| WO | WO 2005121257 A2 * 12/2005 ............... C09C 1/02 |
| WO | 2008013875 A2 | 1/2008 |
| WO | 2008113839 A1 | 9/2008 |
| WO | 2008151991 A1 | 12/2008 |

OTHER PUBLICATIONS

International Search Report dated Aug. 8, 2012 for PCT Application No. PCT/EP2012/063461.
Written Opinion of the International Search Authority dated Aug. 8, 2012 for PCT Application No. PCT/EP2012/063461.
Office Action dated Feb. 27, 2015 for Australian Application No. 2012282543.
Office Action dated May 15, 2015 for Canadian Application No. 2,839,848.
Office Action dated Jan. 22, 2015 for Chinese Application No. 201280034220.5.
Office Action dated Feb. 24, 2015 for Japanese Application No. 2014-519523.
Office Action dated Feb. 26, 2015 for Korean Application No. 10-2013-7012950.
Office Action for Taiwanese Application No. 101124206.
European Search Report dated Oct. 16, 2011 for Application No. EP 11173471.1.
Office Action dated Jul. 6, 2018 for Indian Application No. 2455/MUMNP/2013.

* cited by examiner

HYDROPHOBISED CALCIUM CARBONATE PARTICLES

CROSS-REFERENCE TO RELATED APPLICATIONS

This application is a U.S. national phase of PCT Application No. PCT/EP2012/063461, filed Jul. 10, 2012, which claims priority to European Application No. 11173471.1, filed Jul. 11, 2011 and U.S. Provisional Application No. 61/508,730, filed Jul. 18, 2011.

The present invention relates to a process for the reduction of pitch in an aqueous medium generated in a papermaking or pulping process, to the use of a hydrophobised ground calcium carbonate and/or a hydrophobised precipitated calcium carbonate for reducing the amount of pitch in an aqueous medium as well as to a hydrophobised ground calcium carbonate and/or a hydrophobised precipitated calcium carbonate and a composite comprising the hydrophobised ground calcium carbonate and/or the hydrophobised precipitated calcium carbonate and pitch.

In paper making industries, fibres from various sources and qualities are obtained by processing and refining, e.g. by combinations of grinding, thermal and chemical treatment, wood into fibres. During this pulping process the natural resin contained within the wood is released into the water circuit of the production in the form of microscopic droplets. This wood resin is often referred to as "pitch", and can deposit on the surface of papermaking equipment which can cause time consuming cleanings of the equipment and results in expensive downtimes of the machines. Furthermore, such deposits occasionally appear as visible spots in the final paper product ranging from yellow to black in colour, or can lead to a tear of the paper web involving a loss of output and a reduction in paper quality.

The formation of pitch can be described conceptually as developing via three main mechanisms. The first mechanistic route is the formation of an organic film of material, which can be transparent or translucent. Its thickness varies according to its concentration and the film needs a nucleus to form an initial coalescence. This type of pitch, as its formation mechanism suggests, is called filmy. The second type of pitch is one that is able to coagulate and form globules of 0.1-1.0 μm diameter, and thus is termed globular pitch. The third commonly developed form of pitch is an agglomerated or pitch ball type, and is often noticed in systems having the greatest problems with pitch deposition. The balls formed are of 1-120 μm in diameter. In the filmy or globular state, the pitch does not generally cause problems, but once agglomerates have been formed then pitch deposition starts to occur. Such pitch deposition can also be a problem in recycled or secondary fibre processes where contaminants such as adhesives, inks, hot melts, latexes and waxes agglomerate and form deposits on papermaking equipment.

In the art, several attempts have been made to control the deposition of pitch in paper making processes. In this regard, one strategy involves the introduction of adsorbing materials in the form of various minerals like talc, bentonite or diatomaceous silica to the papermaking process, which will absorb the pitch in the form of small droplets.

For example, JP 2004292998 A relates to talc which is used as the pitch adsorbent. WO 03/085199 A2 relates to a deposit control system consisting of an inorganic or organic coagulant and a microparticulate material such as bentonite clay, cross-linked polymer, colloidal silica, polysilicate for pulp containing white pitch/stickies. US 2003/0096143 A1 describes a method of treating talc particles that will improve talc's wettability and/or talc's affinity to cellulosic fibres. JP 6065892 A refers to a pitch adsorbent composed of magnesium-modified smectite clay mineral produced by modifying the surface layer of a smectite clay mineral with magnesium. FR 2 900 410 and FR 2 900 411 refer to the treatment of minerals and/or talc with amphoteric polymers to be used in pitch control. CA 2,205,277 refers to a method for minimizing pitch, ink, and stickies particulate deposits in the paper making process by causing the retention of such particles onto fibre, comprising the steps of adding an effective pitch, ink, and stickies controlling amount of talc to a suspension of fibre in contact with the paper machine and associated parts and adding an effective pitch, ink, and stickies controlling amount of bentonite to the suspension.

This strategy has the advantage that the pitch is removed with the final product and cannot, thus, concentrate further in the water circuit of the paper machine. In particular, talc is widely accepted as a very effective control agent for pitch deposits. The action of talc in controlling pitch, however, is not exactly established. It is assumed that talc reduces the tackiness of pitch-like materials or stickies so that they have fewer tendencies to form agglomerates or deposits onto paper making equipment or to create spots in the final paper product. Also, the function of talc is to reduce tackiness of materials that already have deposited, so that further accumulation of tacky materials on those surfaces is slowed down. Hereby it is important to add enough talc so that the overall tackiness of the surfaces in the system is reduced.

One problem with talc however is that if not enough talc is used, it tends to be merely incorporated into deposits and agglomerates of tacky materials. Furthermore, talc is known to lose a part of its affinity for colloidal substances in neutral and alkaline paper making processes.

Another strategy involves the colloidal stabilization of the pitch by the use of dispersants or surfactants. The application of this strategy leads to a concentration of the pitch droplets in the paper machine water circuit. For example, EP 0 740 014 refers to a pitch control agent that may comprise a kandite clay (serpentine group) whose particles are coated with a homo- or co-polymer comprising melamine formaldehyde. U.S. Pat. No. 5,626,720 A describes a method for the control of pitch in an aqueous system used in pulp or paper making is disclosed which comprises adding to the system, or to the pulp making or paper making machinery, a water soluble polymer derived from (a) an epihalohydrin, a diepoxide or a precursor of an epihalohydrin or diepoxide, (b) an alkyl amine having a functionality with respect to an epihalohydrin of 2 and (c) an amine which has a functionality with respect to an epihalohydrin greater than 2 and which does not possess any carbonyl groups. JP 11043895 A refers to pitch suppressant by using a cationic compound that is prepared by reaction of an alkylenediamine with an epihalohydrin. WO 98/05819 A1 relates to a liquid composition for the control of pitch deposition in pulp and paper making comprising an aqueous solution of (1) a cationic guar polymer, and (2) isobutylene/maleic anhydride copolymer. EP 0 586 755 A1 describes a process for controlling the deposition of pitch in a pulping or paper making process, wherein there is incorporated into the composition comprising paper making fibres up to 1.0% by weight, based on the weight of dry fibres in the composition, of a cationic polyelectrolyte which is a poly(diallyl di(hydrogen or lower alkyl) ammonium salt) having a number average molecular weight greater than 500,000. US 2011/0094695 A1 describes a method for controlling the deposition of organic contaminants from the pulp and papermaking systems using water soluble aminoplast ether copolymers. EP 1 950 342 A1 refers to aqueous emulsions comprising dialkylamides and non-ionic surfactants. US 2004/0231816 A1 describes a method for controlling pitch and stickies comprising the steps of adding hydrophobically modified hydroxyethyl cellulose (HMHEC) and cationic polymers to a cellulosic fibre slurry (pulp) or to a paper process or to a paper making system and results in a higher degree of inhibiting organic deposition and retention of pitch on paper fibre as compared to the inhibition of the individual ingredients. U.S. Pat. No. 6,153,049 refers to ethyleneamine compound(s), or mixtures thereof, which are used in effective amounts to reduce or inhibit the deposition of white pitch on the paper making equipment during the processing to recycle coated paper. U.S. Pat. No. 6,051,160 A relates to a liquid composition for the control of pitch deposition in pulp and paper making comprising an aqueous solution of (1) a derivatized cationic guar, and (2) styrene maleic anhydride copolymer. JP 2002212897 A refers to a pitch trouble inhibitor for paper making comprising a polydiallyldimethylammonium salt having 20,000-200,000 molecular weight and an inorganic aluminium compound as active ingredients.

However, this strategy often causes problems because changes in temperature, pH or electrolyte concentrations can result in agglomeration with consequent deposition of pitch droplets on the surface of the machine equipment and/or the appearance of spots in the final paper product.

Therefore, there is a continuous need for alternative materials, which provide a better performance than existing adsorbing materials, and effectively reduce pitch in aqueous media generated in papermaking or pulping processes.

This and other objects are solved by the subject-matter of the present invention. According to a first aspect of the present invention, a process for the reduction of pitch in an aqueous medium generated in a papermaking or pulping process is provided, wherein the process comprises the following steps:
a) providing an aqueous medium comprising pitch generated in a papermaking or pulping process;
b) providing a ground calcium carbonate and/or a precipitated calcium carbonate;
c) providing a hydrophobising agent selected from an aliphatic carboxylic acid having between 5 and 24 carbon atoms;
d) contacting the ground calcium carbonate and/or the precipitated calcium carbonate of step b) with the hydrophobising agent of step c) for obtaining a hydrophobised ground calcium carbonate and/or a hydrophobised precipitated calcium carbonate; and
e) contacting the aqueous medium provided in step a) with the hydrophobised ground calcium carbonate and/or the hydrophobised precipitated calcium carbonate obtained in step d).

The inventors surprisingly found that the foregoing process according to the present invention leads to an aqueous medium containing an amount of pitch being lower than the amount of pitch contained in a corresponding aqueous medium obtained by the same process but without contacting it with a hydrophobised ground calcium carbonate and/or a hydrophobised precipitated calcium carbonate (step e)). More precisely, the inventors found that the amount of pitch in an aqueous medium generated in a papermaking or pulping process can be reduced by contacting the aqueous medium with a defined hydrophobised ground calcium carbonate and/or hydrophobised precipitated calcium carbonate.

It should be understood that for the purposes of the present invention, the following terms have the following meaning:

"Pitch" in the meaning of the present invention refers to the tacky materials which form insoluble deposits in pulping and paper making processes. These tacky materials may originate from the wood from which the paper is made. The pitch components comprise dissolved and colloidal substances (DCS) and are characterized by four classes of lipophilic components such as i) fats and fatty acids, ii) steryl esters and sterols, iii) terpenoids, and iv) waxes comprised of fatty alcohols and esters. The chemical composition of the pitch depends on the fibre source, such as variety of tree, and on the seasonal growth from which the sample is produced. These lipophilic pitch components can be stabilised by the presence of ligno-sulphonates and polysaccharides. If recycled paper is used in paper making processes, the term is frequently used as a more general term including all sticky materials which are soluble in organic solvents but not soluble in water, and include, for example, ink or adhesive material present in recycled paper. The depositing material originating from recycled fibre has also been called "stickies". However, for purposes of this invention, the term "pitch" shall include not only naturally occurring pitch particles derived from paper pulp, but also any synthetic or natural sticky materials derived from recycled fibres and which form insoluble deposits in paper making processes.

"Ground calcium carbonate" (GCC) in the meaning of the present invention is a calcium carbonate obtained from natural sources, such as limestone, marble or chalk or dolomite, and processed through a treatment such as grinding, screening and/or fractionizing by a wet and/or dry process, for example, by means of a cyclone or classifier.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water.

An "aqueous medium" in the meaning of the present invention is a liquid medium comprising water, insoluble solids such as fibres and pitch components.

The term "aliphatic carboxylic acid" in the meaning of the present invention refers to straight chain, branched chain, saturated, unsaturated or alicyclic organic compounds composed of carbon and hydrogen. Said organic compound further contains a carboxyl group placed at the end of the carbon skeleton.

The term "hydrophobised" ground calcium carbonate and/or "hydrophobised" precipitated calcium carbonate in the meaning of the present invention refers to a ground calcium carbonate and/or hydrophobised precipitated calcium carbonate that has been processed through an additional treatment step in order to render the surface of the calcium carbonate particles more hydrophobic.

Another aspect of the present invention is directed to a hydrophobised ground calcium carbonate and/or a hydrophobised precipitated calcium carbonate wherein between 10% and 19% of the specific surface area of the ground calcium carbonate and/or the precipitated calcium carbonate is covered by a coating consisting of an aliphatic carboxylic acid having between 5 and 24 carbon atoms and reaction products thereof. It is preferred that between 10% and 19% of the specific surface area of the ground calcium carbonate and/or the precipitated calcium carbonate is covered by a coating consisting of stearic acid and reaction products thereof. It is further preferred that between 13% and 17% of the specific surface area of the ground calcium carbonate and/or the precipitated calcium carbonate is covered by a coating consisting of an aliphatic carboxylic acid having between 5 and 24 carbon atoms and reaction products thereof, preferably by a coating consisting of stearic acid and reaction products thereof. It is also preferred that the source of ground calcium carbonate (GCC) is selected from marble, chalk, calcite, dolomite, limestone and mixtures thereof and/or the precipitated calcium carbonate (PCC) is selected from one or more of the aragonitic, vateritic and calcitic mineralogical crystal forms. It is further preferred that the ground calcium carbonate particles and/or the precipitated calcium carbonate particles have a weight median particle diameter $d_{50}$ value of from 0.1 to 50 μm, preferably from 0.1 to 25 μm, more preferably from 0.1 to 15 μm and most preferably from 0.5 to 5 μm, measured according to the sedimentation method. It is also preferred that the ground calcium carbonate particles and/or the precipitated calcium carbonate particles have a specific surface area of from 0.5 $m^2/g$ to 25 $m^2/g$, preferably 0.5 $m^2/g$ to 15 $m^2/g$ and more preferably 1 $m^2/g$ to 11 $m^2/g$, measured using nitrogen and the BET method. It is further preferred that the hydrophobised ground calcium carbonate and/or the hydrophobised precipitated calcium carbonate is in powder form and/or in the form of granules or in the form of slurry.

A further aspect of the present invention is directed to the use of the hydrophobised ground calcium carbonate and/or the hydrophobised precipitated calcium carbonate for reducing the amount of pitch in an aqueous medium generated in a papermaking or pulping process. A still further aspect of the present invention is directed to a composite comprising the hydrophobised ground calcium carbonate and/or the hydrophobised precipitated calcium carbonate and pitch.

According to one preferred embodiment of the process according to the present invention, the source of ground calcium carbonate (GCC) is selected from marble, chalk, calcite, dolomite, limestone and mixtures thereof and/or the precipitated calcium carbonate (PCC) is selected from one or more of the aragonitic, vateritic and calcitic mineralogical crystal forms.

According to another preferred embodiment of the process according to the present invention, the ground calcium carbonate and/or the precipitated calcium carbonate is in the form of a powder or in the form of slurry.

According to yet another preferred embodiment of the process according to the present invention, the ground calcium carbonate particles and/or the precipitated calcium carbonate particles have a weight median particle diameter $d_{50}$ value of from 0.1 to 50 μm, preferably from 0.1 to 25 μm, more preferably from 0.1 to 15 μm and most preferably from 0.5 to 5 μm, measured according to the sedimentation method weight median particle diameter.

According to one preferred embodiment, the ground calcium carbonate particles and/or the precipitated calcium carbonate particles have a specific surface area of from 0.5 $m^2/g$ to 25 $m^2/g$, preferably 0.5 $m^2/g$ to 15 $m^2/g$ and more preferably 1 $m^2/g$ to 11 $m^2/g$, measured using nitrogen and the BET method.

According to another preferred embodiment of the process according to the present invention, the hydrophobising agent is selected from the group consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof, preferably the hydrophobising agent is selected from the group consisting of octanoic acid, decanoic acid, lauric acid, myristic acid, palmitic acid, stearic acid, arachidic acid and mixtures thereof and most preferably the hydrophobising agent is selected from the group consisting of myristic acid, palmitic acid, stearic acid and mixtures thereof.

According to yet another preferred embodiment, the hydrophobising agent comprises a mixture of two aliphatic carboxylic acids having between 5 and 24 carbon atoms, with the proviso that one aliphatic carboxylic acid is stearic acid.

According to another preferred embodiment, the one aliphatic carboxylic acid is stearic acid and the other one is selected from the group consisting of octanoic acid, myristic acid, palmitic acid, arachidic acid, behenic acid and lignoceric acid.

According to one preferred embodiment of the process according to the present invention, step d) is carried out by mixing the ground calcium carbonate and/or the precipitated calcium carbonate with the hydrophobising agent.

According to another preferred embodiment of the process according to the present invention, step d) is carried out in that both the ground calcium carbonate and/or the precipitated calcium carbonate of step b) and the hydrophobising agent of step c) are provided in the dry state or in a solvent.

According to yet another preferred embodiment of the process according to the present invention, step d) is carried out in that either the ground calcium carbonate and/or the precipitated calcium carbonate of step b) or the hydrophobising agent of step c) is provided in a solvent.

According to one preferred embodiment of the process according to the present invention, the contacting of the ground calcium carbonate and/or the precipitated calcium carbonate with the hydrophobising agent of step d) is carried out under elevated temperature such that the hydrophobising agent is in the liquid or molten state. Preferably, the contacting of step d) is carried out at a temperature of at least 50° C., preferably of at least 75° C., more preferably of between 50° C. and 120° C. and most preferably of between 70° C. and 100° C.

According to another preferred embodiment of the process according to the present invention, less than 20% of the specific surface area of the hydrophobised ground calcium carbonate and/or the hydrophobised precipitated calcium carbonate obtained in step d) is covered by a coating consisting of the hydrophobising agent and reaction products thereof.

According to yet another preferred embodiment of the process according to the present invention, between 10% and 19% of the specific surface area of the hydrophobised ground calcium carbonate and/or the hydrophobised precipitated calcium carbonate obtained in step d) is covered by a coating consisting of the hydrophobising agent and reaction products thereof, preferably between 13% and 17% of the specific surface area.

According to one preferred embodiment of the process according to the present invention, the aqueous medium to be treated is contacted with 0.05 to 20 wt.-%, preferably with 0.5 to 10 wt.-% and most preferably with 0.1 to 5 wt.-% of the hydrophobised ground calcium carbonate and/or the hydrophobised precipitated calcium carbonate, based on the total weight of the aqueous medium.

According to another preferred embodiment of the process according to the present invention, the hydrophobised ground calcium carbonate and/or the hydrophobised precipitated calcium carbonate obtained in step d) is used in powder form and/or in the form of granules or in the form of slurry.

According to yet another preferred embodiment of the process according to the present invention, the pH of the pitch containing aqueous medium is adjusted to a value >6, more preferably >6.5 and even more preferably >7 prior to the addition of the hydrophobised ground calcium carbonate and/or the hydrophobised precipitated calcium carbonate.

According to one preferred embodiment of the process according to the present invention, the pitch containing aqueous medium is selected from the group comprising mechanical pulp, e.g. ground wood, TMP (thermo mechanical pulp), or chemithermomechanical pulp (CTMP), as well as chemical pulp, e.g. kraft pulp or sulphate pulp, or recycled pulp used in the papermaking process.

As set out above, the inventive process for reducing pitch in an aqueous medium generated in a papermaking or pulping process comprises the steps a), b), c), d) and e). In the following, it is referred to further details of the present invention and especially the foregoing steps of the inventive process for reducing pitch in an aqueous medium generated in a papermaking or pulping process.

Step a): Providing an Aqueous Medium Comprising Pitch

According to step a) of the process of the present invention, an aqueous medium is provided comprising pitch generated in a papermaking or pulping process.

A pitch containing aqueous medium is understood to be a mechanical pulp, e.g. ground wood, TMP (thermo mechanical pulp), or chemothermomechanical pulp (CTMP), as well as chemical pulp, e.g. kraft pulp or sulphate pulp, or recycled pulp used in the papermaking or pulping process.

"Mechanical pulp" in the meaning of the present invention is prepared by comminuting logs and chips of pulpwood into the respective fibre components by using mechanical energy. Pitch containing pulp which can be subjected to the process of the present invention particularly comes from wood pulp, which is the most common material used to make paper materials. "Ground wood pulp", as used herein, generally comes from softwood trees such as spruce, pine, fir, larch and hemlock, but also some hardwoods such as *eucalyptus* and is produced by grinding wood into relatively short fibres with stone grinding.

"Thermomechanical pulp", as used herein, is produced in a thermo-mechanical process wherein wood chips or saw dust are softened by steam before entering a pressurized refiner.

"Chemithermomechanical Pulp", as used herein, is produced by treating wood chips with chemicals such as sodium sulfite and steam and subsequent mechanical treatment.

"Chemical pulp", as used herein, is produced by treating wood chips or saw dust with chemicals to liberate the cellulose fibres by removing binding agents such as lignin resins and gums. Sulphate or Kraft are two types of chemical pulping wherein Kraft is the predominant pulping process in chemical pulp production.

"Recycled pulp", as used herein, is derived from recycled paper and paperboard or wastepaper.

The pitch, which can be reduced according to the present invention, can be described as dissolved and colloidal substances (DCS) and comprises such species as fats and fatty acids, steryl esters and sterols, terpenoids, and waxes comprised of fatty alcohols and esters. The chemical composition depends on the fibre source, such as variety of tree, and on the seasonal growth from which the sample is produced.

With respect to recycled pulp, it should be noted that the term pitch is also used to describe sticky, hydrophobic and/or surface charged, pliable organic materials found in recycled paper systems. These organic materials comprise a variety of different materials such as adhesives, styrene-butadiene binders, latex in general, rubber, vinyl acrylates, polyisoprene, polybutadiene, hot melts, etc.

Optionally, additives can be added to the pitch containing aqueous medium sample to be treated. These might include agents for pH adjustment, etc.

Step b): Providing a Ground Calcium Carbonate and/or a Precipitated Calcium Carbonate According to step b) of the process of the present invention, a ground calcium carbonate and/or a precipitated calcium carbonate is provided.

Ground (or natural) calcium carbonate (GCC) is understood to be a naturally occurring form of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs.

Preferably, the source of the ground calcium carbonate is selected from the group comprising marble, chalk, calcite, dolomite, limestone and mixtures thereof. In a preferred embodiment, the source of the ground calcium carbonate is calcite.

The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

Additionally or alternatively, a precipitated calcium carbonate (PCC) is provided. Calcium carbonate polymorphs of the PCC type often include, in addition to calcites, less stable polymorphs of the aragonitic-type, which has an orthorhombic, acicular crystal shape, and hexagonal vateritic-type, which has an even lower stability than aragonite. The different PCC forms may be identified according to their characteristic x-ray powder diffraction (XRD) peaks. PCC synthesis most commonly occurs by a synthetic precipitation reaction that includes a step of contacting carbon dioxide with a solution of calcium hydroxide, the latter being most often provided on forming an aqueous suspension of calcium oxide, also known as burnt lime, and the suspension of which is commonly known as milk of lime. Depending on the reaction conditions, this PCC can appear in various forms, including both stable and unstable polymorphs. Indeed, PCC often represents a thermodynamically unstable calcium carbonate material. When referred to in the context of the present invention, PCC shall be understood to mean synthetic calcium carbonate products obtained by carbonation of a slurry of calcium hydroxide, commonly referred to in the art as a slurry of lime or milk of lime when derived from finely divided calcium oxide particles in water.

Preferred synthetic calcium carbonate is precipitated calcium carbonate comprising aragonitic, vateritic or calcitic mineralogical crystal forms or mixtures thereof.

In one preferred embodiment, a ground calcium carbonate is provided.

In an especially preferred embodiment, the ground calcium carbonate and/or the precipitated calcium carbonate provided in step b) of the present process is not a surface-reacted ground calcium carbonate and/or a surface-reacted precipitated calcium carbonate. In particular, the ground calcium carbonate and/or the precipitated calcium carbonate provided in step b), in the meaning of the present invention, has not been treated with an acid and with carbon dioxide prior to step d) of the present process. Furthermore, it is preferred that the ground calcium carbonate and/or the precipitated calcium carbonate has a weight median particle diameter $d_{50}$ value of from 0.1 to 50 µm, preferably from 0.1 to 25 µm, more preferably from 0.1 to 15 µm and most preferably from 0.5 to 5 µm, measured according to the sedimentation method. For example, the ground calcium carbonate particles and/or the precipitated calcium carbonate particles have a weight median particle diameter $d_{50}$ value of 1.5 µm.

The ground calcium carbonate particles and/or the precipitated calcium carbonate particles preferably have a specific surface area of from 0.5 $m^2/g$ to 25 $m^2/g$, preferably 0.5 $m^2/g$ to 15 $m^2/g$ and more preferably 1 $m^2/g$ to 11 $m^2/g$, measured using nitrogen and the BET method. For example, the ground calcium carbonate particles and/or the precipitated calcium carbonate particles have a specific surface area of from 3.5 $m^2/g$ to 4 $m^2/g$. Alternatively, the ground calcium carbonate particles and/or the precipitated calcium carbonate particles have a specific surface area of from 1.0 $m^2/g$ to 1.5 $m^2/g$. Alternatively, the ground calcium carbonate particles and/or the precipitated calcium carbonate particles have a specific surface area of from 10 $m^2/g$ to 10.5 $m^2/g$.

In a preferred embodiment, the ground natural calcium carbonate particles and/or the precipitated calcium carbonate particles have a specific surface area within the range of 0.5 $m^2/g$ to 25 $m^2/g$ and a weight median particle diameter $d_{50}$ value within the range of 0.1 to 50 µm. More preferably, the specific surface area is within the range of 0.5 $m^2/g$ to 15 $m^2/g$ and the weight median particle diameter $d_{50}$ value is within the range of 0.1 to 25 µm. Even more preferably, the specific surface area is within the range of 0.5 $m^2/g$ to 15 $m^2/g$ and the weight median particle diameter is within the range of 0.1 to 15 µm. Most preferably, the specific surface area is within the range of 1 $m^2/g$ to 11 $m^2/g$ and the weight median particle diameter $d_{50}$ value is within the range of 0.5 to 5 µm. For example, the ground calcium carbonate particles and/or the precipitated calcium carbonate particles have a specific surface area within the range of 3.5 $m^2/g$ to 4 $m^2/g$ and a weight median particle diameter $d_{50}$ value of 1.5 µm. Alternatively, the ground calcium carbonate particles and/or the precipitated calcium carbonate particles have a specific surface area within the range of 10 $m^2/g$ to 10.5 $m^2/g$ and a weight median particle diameter $d_{50}$ value of 0.6 µm.

In one especially preferred embodiment, ground calcium carbonate particles are provided having a specific surface area within the range of 3.5 $m^2/g$ to 4 $m^2/g$ and a weight median particle diameter $d_{50}$ value of 1.5 µm. In another especially preferred embodiment, ground calcium carbonate particles are provided having a specific surface area within the range of 10 $m^2/g$ to 10.5 $m^2/g$ and a weight median particle diameter $d_{50}$ value of 0.6 µm.

In one preferred embodiment, the ground calcium carbonate and/or the precipitated calcium carbonate is provided in the form of a powder.

The term "powder" as used in the present invention, encompasses solid mineral powders of at least 90 wt.-% inorganic mineral matter, based on the total weight of the powder, wherein the powder particles have a weight median particle diameter $d_{50}$ value of 50 µm or less, preferably less than 25 µm, and more preferably of less than 15 µm, most preferably between 0.5 µm and 5.0 µm, measured according to the sedimentation method.

Alternatively or additionally, the ground calcium carbonate and/or the precipitated calcium carbonate is provided in the form of slurry.

A "slurry" in the meaning of the present invention is a suspension comprising insoluble solids and water and optionally further additives. Slurries usually contain large amounts of solid and are more viscous and generally of higher density than the liquid from which they are formed. It is accepted in the art that the general term "dispersion" inter alia covers "suspensions" as a specific type of dispersion.

In order to obtain ground calcium carbonate particles and/or the precipitated calcium carbonate of the respective dimensions, the ground calcium carbonate and/or the precipitated calcium carbonate may be subjected to a grinding process prior to the treatment with a hydrophobising agent according to step d) of the process of the present invention. The grinding step can be carried out with any conventional grinding device such as a grinding mill known to the skilled person.

Such grinding step may require a drying of the ground calcium carbonate and/or the precipitated calcium carbonate, thereby obtaining the ground calcium carbonate and/or the precipitated calcium carbonate in the form of a powder.

The term "dried" is understood to refer to ground calcium carbonate particles and/or to precipitated calcium carbonate particles having a total surface moisture content of less than 0.5 wt.-%, preferably less than 0.2 wt.-% and more preferably less than 0.1 wt.-%, based on the total weight of the ground calcium carbonate particles and/or the precipitated calcium carbonate particles.

Step c): Providing a Hydrophobising Agent

According to step c) of the process of the present invention, a hydrophobising agent selected from an aliphatic carboxylic acid having between 5 and 24 carbon atoms is provided.

The aliphatic carboxylic acid in the meaning of the present invention may be selected from one or more straight chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one preferred embodiment, the hydrophobising agent is selected from saturated unbranched carboxylic acids, that is to say the hydrophobising agent is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In a further preferred embodiment, the hydrophobising agent is selected from the group consisting of octanoic acid, decanoic acid, lauric acid, myristic acid, palmitic acid, stearic acid, arachidic acid and mixtures thereof. Preferably, the hydrophobising agent is selected from the group consisting of myristic acid, palmitic acid, stearic acid and mixtures thereof.

In an especially preferred embodiment, the hydrophobising agent is stearic acid.

In one preferred embodiment, the hydrophobising agent comprises a mixture of at least two aliphatic carboxylic acids having between 5 and 24 carbon atoms. Preferably, a mixture of two carboxylic acids having between 5 and 24 carbon atoms is provided, with the proviso that one aliphatic carboxylic acid is stearic acid.

In an even more preferred embodiment, the one aliphatic carboxylic acid is from acid and the other one is selected from the group consisting of octanoic acid, myristic acid, palmitic acid, arachidic acid, behenic acid and lignoceric acid.

If the hydrophobising agent according to the present invention comprises a mixture of two aliphatic carboxylic acids having between 5 and 24 carbon atoms, the mole ratio of stearic acid and the second aliphatic carboxylic acid is from 99:1 to 1:99, more preferably from 50:1 to 1:50, even more preferably from 25:1 to 1:25 and most preferably from 10:1 to 1:10. In one especially preferred embodiment of the present invention, the mole ratio of stearic acid and the second aliphatic carboxylic acid is from 90:1 to 1:1, more preferably from 90:1 to 10:1 and most preferably from 90:1 to 50:1. In another preferred embodiment, the mole ratio of stearic acid and the second aliphatic carboxylic acid is 1:1.

If the hydrophobising agent according to the present invention comprises a mixture of two aliphatic carboxylic acids having between 5 and 24 carbon atoms, the hydrophobising agent preferably comprises a mixture of stearic acid and myristic acid. In a further preferred embodiment, the hydrophobising agent comprises a mixture of stearic acid and palmitic acid. In yet another preferred embodiment, the hydrophobising agent comprises a mixture of stearic acid and arachidic acid. In still another preferred embodiment, the hydrophobising agent comprises a mixture of stearic acid and behenic acid. In a further preferred embodiment, the hydrophobising agent comprises a mixture of stearic acid and lignoceric acid. In yet another preferred embodiment, the hydrophobising agent comprises a mixture of stearic acid and octanoic acid.

The hydrophobising agent is preferably provided in the form of flakes of the respective aliphatic carboxylic acid. Additionally or alternatively, the hydrophobising agent is provided in a solvent, i.e. the hydrophobising agent is in a dissolved state. A "dissolved state" in the meaning of the present invention is defined as the state in which the hydrophobising agent and the solvent form a homogeneous phase.

Preferably, the solvent is chosen from the groups of alcohol, ketones, carboxylesters, ethers, alkanes or aryl compounds. The solvents have a melting point preferably between −90° C. to 0° C. For example, ethanol, acetone or toluene can be chosen.

In one preferred embodiment, the hydrophobising agent is provided in the liquid or molten state of the respective aliphatic carboxylic acid, i.e. if the aliphatic carboxylic acid is a solid at room temperature, the hydrophobising agent is heated up to a temperature such that the liquid form of the aliphatic carboxylic acid is obtained. Preferably, the hydrophobising agent is heated up to a temperature of at least 50° C., preferably of at least 75° C., more preferably of between 50° C. and 120° C. and most preferably of between 70° C. and 100° C. For example, the hydrophobising agent is heated up to a temperature of 80° C.

Step d): Contacting the Ground Calcium Carbonate and/or the Precipitated Calcium Carbonate with the Hydrophobising Agent According to step d) of the process of the present invention, the ground calcium carbonate and/or the precipitated calcium carbonate of step b) is contacted with the hydrophobising agent of step c) for obtaining a hydrophobised ground calcium carbonate and/or a hydrophobised ground calcium carbonate.

In the process of the present invention, the contacting of the ground calcium carbonate and/or the precipitated calcium carbonate with the hydrophobising agent is preferably carried out by mixing the ground calcium carbonate and/or the precipitated calcium carbonate with the hydrophobising agent. "Mixing" in the sense of the present invention can be effected by any conventional mixing process known to the skilled person. Preferably, the mixing is carried out under continuous agitation in order to evenly contact the ground calcium carbonate particles and/or the precipitated calcium carbonate particles of step b) with the hydrophobising agent of step c).

In one preferred embodiment, the contacting of step d) is carried out in that either the ground calcium carbonate and/or the precipitated calcium carbonate of step b) or the hydrophobising agent of step c) is provided in a solvent. That is to say, either the ground calcium carbonate and/or the precipitated calcium carbonate of step b) is provided in the form of slurry or the hydrophobising agent of step c) is dissolved in a solvent. For example, if the ground calcium carbonate and/or the precipitated calcium carbonate of step b) is provided in the form of slurry, the hydrophobising agent of step c) is provided in the form of flakes or the hydrophobising agent of step c) is provided in the liquid or molten state. Alternatively, if the hydrophobising agent of step c) is provided in a solvent, the ground calcium carbonate and/or the precipitated calcium carbonate of step b) is provided in the form of a powder.

In one preferred embodiment, the ground calcium carbonate and/or the precipitated calcium carbonate of step b) is provided in the form of slurry and the hydrophobising agent of step c) is provided in the molten state. In one preferred embodiment, the slurry of the ground calcium carbonate and/or the precipitated calcium carbonate is preheated.

In another preferred embodiment, the contacting of step d) can either be carried out by contacting both the ground calcium carbonate and/or the precipitated calcium carbonate of step b) and the hydrophobising agent of step c) (i) in the dry state, or (ii) in a solvent.

For example, if the contacting of step d) is carried out in a solvent, then the hydrophobising agent of step c) has to be in a dissolved state within the solvent, while the ground calcium carbonate and/or the precipitated calcium carbonate of step b) is provided in the form of slurry. In one preferred embodiment, the slurry of the ground calcium carbonate and/or the precipitated calcium carbonate is preheated.

Alternatively, the contacting of step d) is carried out by contacting the ground calcium carbonate and/or the precipitated calcium carbonate of step b) and the hydrophobising agent of step c) in the dry state. For example, the contacting of step d) is carried out in that the ground calcium carbonate and/or the precipitated calcium carbonate of step b) is provided in the form of a powder and the hydrophobising agent of step c) is provided in the form of flakes or the hydrophobising agent of step c) is provided in the liquid or molten state. In one preferred embodiment, the ground calcium carbonate and/or the precipitated calcium carbonate of step b) is provided in the form of a powder and the hydrophobising agent of step c) is provided in the molten state.

In one preferred embodiment of the present process, the contacting of the ground calcium carbonate and/or the precipitated calcium carbonate with the hydrophobising agent is carried out at elevated temperature such that the hydrophobising agent is in the liquid or molten state.

A "liquid" or "molten" state in the meaning of the present invention is defined as the state in which the hydrophobising agent is entirely liquid, in other words is entirely melted. Whereas the phenomenon of melting occurs at constant temperature on application of energy, a substance is qualified as being molten as of the moment following melting when the temperature begins to rise, as observed on a curve plotting temperature versus energy input obtained by Dynamic Scanning Calorimetry, DSC, (DIN 51005: 1983-11).

Preferably, the ground calcium carbonate and/or the precipitated calcium carbonate is contacted with the hydrophobising agent at a temperature of at least 50° C., preferably at least 75° C., more preferably between 50° C. and 120° C. and most preferably between 70° C. and 100° C. In a preferred embodiment, the ground calcium carbonate and/or the precipitated calcium carbonate is contacted with the hydrophobising agent at a temperature of 80° C. In an especially preferred embodiment, the ground calcium carbonate and/or the precipitated calcium carbonate is contacted with the hydrophobising agent at a constant temperature.

For example, if stearic acid is used as the hydrophobising agent, the ground calcium carbonate and/or the precipitated calcium carbonate is preferably contacted with the hydrophobising agent at a temperature of at least 70° C. and more preferably at a temperature of 80° C. If octanoic acid or myristic acid is used as the hydrophobising agent, the ground calcium carbonate and/or the precipitated calcium carbonate is preferably contacted with the hydrophobising agent at a temperature of at least 55° C. and more preferably at a temperature of 65° C. If palmitic acid is used as the hydrophobising agent, the ground calcium carbonate and/or the precipitated calcium carbonate is preferably contacted with the hydrophobising agent at a temperature of at least 65° C. and more preferably at a temperature of 75° C. If arachidic acid is used as the hydrophobising agent, the ground calcium carbonate and/or the precipitated calcium carbonate is preferably contacted with the hydrophobising agent at a temperature of at least 75° C. and more preferably at a temperature of 85° C. If behenic acid is used as the hydrophobising agent, the ground calcium carbonate and/or the precipitated calcium carbonate is preferably contacted with the hydrophobising agent at a temperature of at least 80° C. and more preferably at a temperature of 90° C. If lignoceric acid is used as the hydrophobising agent, the ground calcium carbonate and/or the precipitated calcium carbonate is preferably contacted with the hydrophobising agent at a temperature of at least 85° C. and more preferably at a temperature of 95° C.

In one preferred embodiment, the hydrophobised ground calcium carbonate is prepared by contacting the ground calcium carbonate with stearic acid at a temperature of 80° C.

In another preferred embodiment, the hydrophobised precipitated calcium carbonate is prepared by contacting the precipitated calcium carbonate with stearic acid at a temperature of 80° C.

In a further preferred embodiment, the ground calcium carbonate and/or the precipitated calcium carbonate is pre-heated, i.e. the powder or slurry of ground calcium carbonate and/or the precipitated calcium carbonate is stirred for a sufficient period of time at an elevated temperature in order to ensure an even distribution of heat within the particles or within the slurry.

Preferably, the pre-heating of the ground calcium carbonate particles and/or the precipitated calcium carbonate particles is carried out under continuous stirring at elevated temperature. In one preferred embodiment, the pre-heating of the ground calcium carbonate and/or the precipitated calcium carbonate is carried out under continuous stirring at a constant temperature of at least 50° C., preferably of at least 75° C., more preferably of between 50° C. and 120° C. and most preferably of between 70° C. and 100° C. In a further preferred embodiment, the pre-heating of the ground calcium carbonate and/or the precipitated calcium carbonate is carried out under continuous stirring at a constant temperature of 80° C.

In case the ground calcium carbonate and/or the precipitated calcium carbonate is pre-heated, the pre-heating is preferably carried out for a period of time of at least 30 s, more preferably of at least 90 s and most preferably of at least 120 s. In a preferred embodiment, the pre-heating is carried out for a period of time of between 1 min and 5 min, preferably between 1 min and 4 min and most preferably between 2 min and 3 min, e.g. for 2.5 min. For example, the pre-heating of the ground calcium carbonate and/or the precipitated calcium carbonate is carried out under continuous stirring at a constant temperature of 80° C. for a period of time of 2.5 min.

After the hydrophobising agent has been added to the ground calcium carbonate and/or the precipitated calcium carbonate, the blend of hydrophobising agent and ground calcium carbonate and/or the precipitated calcium carbonate is preferably contacted by mixing for a sufficient period of time at elevated temperature in order to ensure an even distribution of hydrophobising agent on the surface of the ground calcium carbonate particles and/or the precipitated calcium carbonate particles. In one preferred embodiment, the blend of hydrophobising agent and ground calcium carbonate and/or precipitated calcium carbonate is mixed at a temperature of at least 50° C., preferably of at least 75° C., more preferably of between 50° C. and 120° C. and most preferably of between 70° C. and 100° C. For example, the blend of hydrophobising agent and ground calcium carbonate and/or precipitated calcium carbonate is mixed at a temperature of 80° C.

The mixing of the blend of hydrophobising agent and ground calcium carbonate and/or precipitated calcium carbonate at elevated temperature is preferably carried out for a period of time of at least 1 min, more preferably of at least 2 min and most preferably of at least 4 min.

The mixing of the blend of hydrophobising agent and ground calcium carbonate and/or precipitated calcium carbonate at elevated temperature is carried out in one or more intervals. The term "one interval", as used herein, refers to a continuous mixing of the blend at elevated temperature for a defined period of time. The term "more intervals" refers to a discontinuous mixing of the blend at elevated temperature for a defined period of time in which the mixing is interrupted for at least once.

In one preferred embodiment, the mixing of the blend of hydrophobising agent and ground calcium carbonate and/or precipitated calcium carbonate at elevated temperature is carried out in one interval. For example, the blend of hydrophobising agent and ground calcium carbonate and/or precipitated calcium carbonate is continuously mixed for a period of time of between 1 min and 10 min, preferably between 2 min and 8 min and most preferably between 4 min and 6 min, e.g. for 5 min. For example, the contacting of the blend of hydrophobising agent and ground calcium carbonate and/or precipitated calcium carbonate is carried out under continuous mixing at a temperature of 80° C. for a period of time of 5 min.

In case the mixing of the blend of hydrophobising agent and ground calcium carbonate and/or precipitated calcium carbonate at elevated temperature is carried out in more than one interval, the mixing is preferably carried out in two intervals. In one preferred embodiment, the mixing of the blend of hydrophobising agent and ground calcium carbonate and/or precipitated calcium carbonate at elevated temperature is carried out in two equal intervals, i.e. the intervals are about equal in time. For example, the mixing of the blend of hydrophobising agent and ground calcium carbonate and/or precipitated calcium carbonate at elevated temperature is carried in that each interval has an equal length of between 1 min and 5 min, preferably between 1 min and 4 min and most preferably between 2 min and 3 min, e.g. 2.5 min.

In another preferred embodiment, the mixing of the blend of hydrophobising agent and ground calcium carbonate at elevated temperature is carried out in two unequal intervals, i.e. the intervals are unequal in time. For example, the mixing of the blend of hydrophobising agent and ground calcium carbonate and/or precipitated calcium carbonate at elevated temperature is carried out in that each interval has a length of between 1 min and 5 min, preferably between 1 min and 4 min and most preferably between 2 min and 3 min.

The degree of hydrophobising (X) can be adjusted by the percentage of available specific surface area covered by a coating consisting of the hydrophobising agent and reaction products thereof. The degree of hydrophobising (X) can be calculated with the following Eq. 1:

$$X = \delta m_{Exp}/(M_{FA} * A_s * n_A) \quad [1]$$

wherein
X: degree of hydrophobising
$\delta m_{Exp}$: Experimental mass loss in TGA between 150° C. and 400° C.
$M_{FA}$: Molecular mass of the carboxylic acid
$A_s$: Specific surface area of the ground calcium carbonate particle and/or the precipitated calcium carbonate particle
$n_A$: Carboxylic acid molecules needed to cover 1 m² of the ground calcium carbonate particle and/or the precipitated calcium carbonate. Usually 6 $\mu mol*m^{-2}$ for carboxylic acids.

Preferably, the degree of hydrophobising is adjusted to a value still enabling the formation of a suspension of the hydrophobised ground calcium carbonate particles and/or the hydrophobised precipitated calcium carbonate particles in the aqueous medium to be treated under a reasonable degree of agitation. Flotation of the hydrophobised ground calcium carbonate and/or the hydrophobised precipitated calcium carbonate on the water surface even under a reasonable degree of agitation should be avoided.

The term "reaction products" in the meaning of the present invention refers to the products typically obtained by contacting a ground calcium carbonate and/or a precipitated calcium carbonate with a hydrophobising agent selected from an aliphatic carboxylic acid having between 5 and 24 carbon atoms. Said reaction products are preferably formed between the applied hydrophobising agent and molecules located at the surface of the ground calcium carbonate and/or the precipitated calcium carbonate.

In particular, less than 20% of the specific surface area of the ground calcium carbonate particles and/or the precipitated calcium carbonate particles obtained in step d) is covered by a coating consisting of the hydrophobising agent and reaction products thereof. In a preferred embodiment, between 10% and 19% of the specific surface area of the ground calcium carbonate particles and/or the precipitated calcium carbonate particles obtained in step d) is covered by a coating consisting of the hydrophobising agent and reaction products thereof, preferably between 13% and 17% of the specific surface area. For example, 15% of the specific surface area of the ground calcium carbonate particles and/or the precipitated calcium carbonate particles is covered by a coating consisting of the hydrophobising agent and reaction products thereof. In an especially preferred embodiment, 15% of the specific surface area of the ground calcium carbonate particles and/or the precipitated calcium carbonate particles is covered by a coating consisting of stearic acid and reaction products thereof.

The hydrophobised ground calcium carbonate and/or the hydrophobised precipitated calcium carbonate thus obtained may advantageously be implemented in process step e) of the present application for the reduction of pitch in an aqueous medium generated in a papermaking or pulping process.

Step e): Contacting the Aqueous Medium with the Hydrophobised Ground Calcium Carbonate and/or the Hydrophobised Precipitated Calcium Carbonate According to step e) of the process of the present invention, the pitch containing aqueous medium provided in step a) is contacted with the hydrophobised ground calcium carbonate and/or the hydrophobised precipitated calcium carbonate obtained in step d).

In the process of the present invention, the hydrophobised ground calcium carbonate and/or the hydrophobised precipitated calcium carbonate can be brought into contact with the pitch containing aqueous medium by any conventional feeding means known to the skilled person.

The hydrophobised ground calcium carbonate and/or the hydrophobised precipitated calcium carbonate can be added to the aqueous medium to be treated in any appropriate form, e.g. in the form of granules or a powder or in the form of a cake. Preferably, the hydrophobised ground calcium carbonate and/or the hydrophobised precipitated calcium carbonate is in powder form and/or in the form of granules. In a preferred embodiment, the hydrophobised ground calcium carbonate and/or the hydrophobised precipitated calcium carbonate is in powder form, before being brought into contact with the aqueous medium to be treated. Alternatively, the hydrophobised ground calcium carbonate and/or the hydrophobised precipitated calcium carbonate can be added to the aqueous medium to be purified as an aqueous suspension, e.g. in the form of slurry.

A "suspension" in the meaning of the present invention comprises insoluble solids, i.e. hydrophobised ground calcium carbonate and/or the hydrophobised precipitated calcium carbonate, and water and optionally further additives. Suspensions usually contain large amounts of solids and are more viscous and generally of higher density than the liquid from which they are formed. It is accepted in the art that the general term "dispersion" inter alia covers "suspensions" as a specific type of dispersion.

In one preferred process of the present invention, the hydrophobised ground calcium carbonate and/or the hydrophobised precipitated calcium carbonate is suspended in water before being brought into contact with the aqueous medium to be treated. Preferably, such suspension has a content of hydrophobised ground calcium carbonate and/or the hydrophobised precipitated calcium carbonate within the range of 1 wt.-% to 80 wt.-%, more preferably 3 wt.-% to 60 wt.-%, and even more preferably 5 wt.-% to 40 wt.-%, based on the weight of the suspension.

The hydrophobised ground calcium carbonate and/or the hydrophobised precipitated calcium carbonate can be kept in suspension, optionally further stabilised by a dispersant. Conventional dispersants known to the skilled person can be used. A preferred dispersant is polyacrylic acid.

Within the context of the present invention, it is also possible to provide an immobile phase, e.g. in the form of a cake or layer, comprising the hydrophobised ground calcium carbonate and/or the hydrophobised precipitated calcium carbonate, the aqueous medium running through said immobile phase. In an alternative embodiment, the aqueous medium to be purified is passed through a permeable filter comprising the hydrophobised ground calcium carbonate and/or the hydrophobised precipitated calcium carbonate, and optionally talc and being capable of retaining, via size exclusion, the impurities on the filter surface as the liquid is passed through by gravity and/or under vacuum and/or under pressure. This process is called "surface filtration".

In another preferred technique known as depth filtration, a filtering aid comprising of a number of tortuous passages of varying diameter and configuration retains impurities by molecular and/or electrical forces adsorbing the impurities onto the hydrophobised ground calcium carbonate and/or the hydrophobised precipitated calcium carbonate which is present within said passages, and/or by size exclusion, retaining the impurity particles if they are too large to pass through the entire filter layer thickness.

Preferably, the hydrophobised ground calcium carbonate and/or the hydrophobised precipitated calcium carbonate is suspended in the pitch containing aqueous medium, e.g. by agitation means. The amount of hydrophobised ground calcium carbonate and/or the hydrophobised precipitated calcium carbonate depends on the type of pitch or pitch species to be adsorbed. Preferably, an amount of 0.05-25 wt.-%, more preferably 0.25-10 wt.-% and most preferably 0.5-2 wt.-%, based on the weight on oven (100° C.) dry fibres, is added. Alternatively, the amount of hydrophobised ground calcium carbonate and/or the hydrophobised precipitated calcium carbonate to be used for the aqueous medium treatment is 0.05 to 20 wt.-%, more preferably 0.5 to 10 wt.-% and even more preferably 0.1 to 5 wt.-%, based on the total weight of the aqueous medium to be treated.

In a preferred embodiment, the pH of the pitch containing aqueous medium is adjusted to a value greater than 6.0, more preferably greater than 6.5 and even more preferably greater than 7.0 prior to the addition of hydrophobised ground calcium carbonate and/or the hydrophobised precipitated calcium carbonate.

In a preferred embodiment, talc is added to the pitch containing aqueous medium in addition with the hydrophobised ground calcium carbonate and/or the hydrophobised precipitated calcium carbonate.

Talcs which are useful in the present invention are any commercially available talcs, such as, e.g. talcs from Sotkamo (Finland), Three Springs (Australia), Haicheng (China), from the Alpes (Germany), Florence (Italy), Tyrol (Austria), Shetland (Scotland), Transvaal (South Africa), the Appalachians, Calif., Vermont and Texas (USA).

Depending on the origin of the coarse talc, there may be several impurities contained therein such as chlorite, dolomite and magnesite, amphibole, biotite, olivine, pyroxene, quartz and serpentine.

Preferred for the use in the present invention are talcs having a content of pure talc of >90 weight-%, for example >95 weight-% or >97 weight-% and up to >100 weight-%.

The talc particles used in the present invention may have a weight median particle diameter $d_{50}$, measured according to the sedimentation method, in the range of 0.1 to 50 μm, e.g. 0.2 to 40 μm, preferably 0.3 to 30 μm, more preferably 0.4 to 20 μm, particularly 0.5 to 10 μm, e.g. 1, 4 or 7 μm.

The specific surface area of the talc can be between 3 and 100 $m^2/g$, preferably between 7 $m^2/g$ and 80 $m^2/g$ more preferably between 9 $m^2/g$ and 60 $m^2/g$, e.g. 51 $m^2/g$, especially between 10 and 50 $m^2/g$, for example 30 $m^2/g$, measured using nitrogen and the BET.

The talc can be used in powder form. As an alternative, it can be kept in suspension, optionally further stabilised by a dispersant. Conventional dispersants known to the skilled person can be used. The dispersant can be anionic or cationic.

Preferably, the hydrophobised ground calcium carbonate and/or the hydrophobised precipitated calcium carbonate and the talc are mixed, preferably in powder form, before being brought into contact with the pitch containing aqueous medium to be treated. Blending can be accomplished by any conventional means known to the skilled person.

Alternatively, the hydrophobised ground calcium carbonate and/or the hydrophobised precipitated calcium carbonate and the talc can be added to the pitch containing aqueous medium in separate steps.

Preferably, the talc is suspended together with the hydrophobised ground calcium carbonate and/or the hydrophobised precipitated calcium carbonate in the pitch containing aqueous medium, e.g. by agitation means. The amount of talc depends on the type of pitch or contaminant species to be adsorbed. Preferably, an amount of 0.05-25 wt.-%, more preferably 0.25-10 wt.-% and most preferably 0.5-2 wt.-%, based on the weight on oven (100° C.) dry fibres, is added. Alternatively, the amount of talc to be used for the water treatment is 0.05 to 20 wt.-%, more preferably 0.5 to 10 wt.-% and even more preferably 0.1 to 5 wt.-%, based on the total weight of the pitch containing aqueous medium to be treated.

After the adsorption is completed the composites of hydrophobised ground calcium carbonate and/or the hydrophobised precipitated calcium carbonate, pitch, and optionally talc, can be separated from the aqueous medium by conventional separation means known to the skilled person such as sedimentation and filtration.

The aqueous medium obtained in step e) of the present process contains an amount of pitch that is lower than the amount of pitch contained in a corresponding aqueous medium obtained by the same process but without contacting it with the hydrophobised ground calcium carbonate and/or the hydrophobised precipitated calcium carbonate. In one preferred embodiment, the aqueous medium obtained in step e) of the present process contains an amount of colloidal pitch that is lower than the amount of pitch contained in a corresponding aqueous medium obtained by the same process but without contacting it with the hydrophobised ground calcium carbonate and/or the hydrophobised precipitated calcium carbonate.

Preferably, the aqueous medium obtained in step e) contains an amount of pitch that is reduced by at least 20 wt.-%, more preferably by at least 50 wt.-% and most preferably by at least 75 wt.-%, compared to the pitch containing aqueous medium provided in step a).

According to a further aspect of the present invention, a composite is provided comprising the hydrophobised ground calcium carbonate and/or the hydrophobised precipitated calcium carbonate, pitch, and optionally talc. With regard to the definition of the hydrophobised ground calcium carbonate and/or the hydrophobised precipitated calcium carbonate, the pitch, the talc, and preferred embodiments thereof, reference is made to the statements provided above when discussing process steps a), b), c), d) and e).

The hydrophobised ground calcium carbonate and/or the hydrophobised precipitated calcium carbonate of the present invention has been shown to adsorb readily pitch species in the paper making environment. In particular, aqueous media obtained by the process of the present invention are characterized in that they contain a considerably reduced amount of pitch or pitch species such as colloidal pitch. Papers manufactured from these aqueous media are characterized in that less spots are created in the final product. As another advantage, the hydrophobised ground calcium carbonate and/or the hydrophobised precipitated calcium carbonate reduces the tendency to form deposits onto papermaking equipment.

In view of the very good results of the hydrophobised ground calcium carbonate and/or the hydrophobised precipitated calcium carbonate in reducing pitch in an aqueous medium generated in a papermaking or pulping process as defined above, a further aspect of the present invention is the use thereof in an aqueous medium for reducing the amount of pitch therein. According to another aspect of the present invention, a hydrophobised ground calcium carbonate and/or the hydrophobised precipitated calcium carbonate is provided characterized in that between 10% and 19% of the specific surface area of the ground calcium carbonate and/or the precipitated calcium carbonate is covered by a coating consisting of an aliphatic carboxylic acid having between 5 and 24 carbon atoms and reaction products thereof. With regard to the definition of the hydrophobised ground calcium carbonate and/or the precipitated calcium carbonate and preferred embodiments thereof, reference is made to the statements provided above when discussing the process steps b), c), d) and e).

The following figures, examples and tests will illustrate the present invention, but are not meant to restrict the invention to the exemplified embodiments. The examples below show the effectiveness of hydrophobised ground calcium carbonate and/or the precipitated calcium carbonate for reducing pitch in an aqueous medium generated in a papermaking or pulping process according to the present invention.

EXAMPLES

A. Materials and Methods

1. Pitch Containing Pulp

Figure 1:
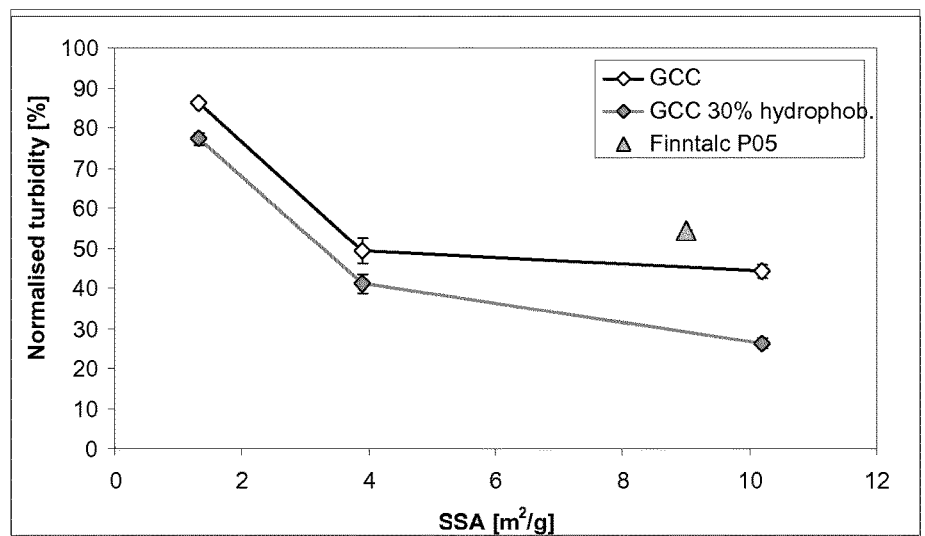
FIG. 1: illustrates the normalised turbidity after the mineral treatment of the TMP filtrate. 100% corresponds to 349 NTU.

Four separate trials are provided using unbleached TMP that consisted of 70% spruce, the rest being composed of fir and a small part of pine. These TMP samples were collected in a paper mill in Switzerland. The mill uses 100% fresh water in their TMP plant. The fresh wet pulp was taken from the "accept" of the screen at a temperature of 90° C. before the bleaching step. The TMP was left overnight to cool down to room temperature (rt). The TMP was filtered through a filter of 2 µm pore size (filter paper, circular 602 EH). The filtrate was checked under a light microscope (Olympus AX-70) for the absence of fibres and fibrils. The adsorption experiments were performed immediately after filtration. The pH of the filtrates was usually between 6.0 and 7.0. It was adjusted with 0.1 M sodium hydroxide to pH 7.0-7.5. A pH titration of the electrophoretic mobility was made in order to quantify the colloidal stability of the wood resin droplets. This was done on a Malvern Zetasizer NS using 0.1 M hydrochloric acid and 0.1 M sodium hydroxide solutions. In addition the total electrochemical charge was determined by titrating the TMP filtrate with 0.0025 M poly-DADMAC [poly-(allyldimethyl-ammonium chloride) using a streaming current detector (SCD) from Mütek (PDC-03). In addition the ion content was quantified by ion chromatography on a Dionex DX 120 Ion-chromatograph.

After adjustment of the pH the TMP filtrate was distributed into glass bottles each containing 200 $cm^3$ of the TMP filtrate. The desired amount and type of mineral was added either as a powder or dispersed in water. In most cases the mineral dosage was 10 $g/dm^3$ and in the case of the isotherm the mineral dosage was varied between 2.5 and 50.0 $g/dm^3$. For all samples in a trial row the same amount of water was added (usually 18 $cm^3$). The bottles were equipped with a magnetic stirring bar, closed with an air-tight lid and stirred on a magnetic stirrer for 2 hours. After this time the magnetic stirring bar was removed and the experimental mixtures centrifuged (Jouan C 312 by IG Instruments) for 15 minutes at 2 600 g. Two phases were collected; an upper liquid phase and a lower sediment mineral-containing phase. Centrifugation of the untreated TMP filtrate did not show any sediment. However, sedimentation of the pure mineral dispersions showed in some cases air bubbles with entrapped mineral particles.

The upper liquid phase was analysed for turbidity by means of a NOVASINA 155 model NTM-S turbidity probe. The particle size was measured by photon correlation spectroscopy on a Malvern Zetasizer NS without any further treatment or dilution. Chemical oxygen demand (COD) was measured using a Lange CSB LCK 014, covering a range 1 000-10 000 mg/dm$^3$ with a LASA 1/Plus cuvette. 100 cm$^3$ of the liquid phase was dried in an aluminium beaker at 90° C. for 12 hours and the residue weighed to provide a result for the gravimetric residue.

The properties of the four TMP samples are summarized in the following Table 1. The presented ranges are based on the standard deviation of three independent experiments.

TABLE 1

|  | TMP filtrate 1 | TMP filtrate 2 | TMP filtrate 3 | TMP filtrate 4 |
|---|---|---|---|---|
| Turbidity [NTU][1] | 349 ± 1 | 358 ± 1 | 393 ± 8 | 497 |
| Chemical Oxygen demand [mg/dm$^3$] | 3 644 ± 21 | 3 944 ± 27 | 3 140 ± 49 | 4 350 ± 40 |
| Gravimetry [g/dm$^3$] | 3.11 ± 0.0005 | 3.43 ± 0.005 | 2.84 ± 0.014 | 3.57 |
| Electrochemical charge (SCD) [µEq/g] | −2.3 | −1.3 | −1.1 | −0.3 |
| pH | 7.0 | 7.0 | 7.0 | 7.2 |
| Conductivity [µS/cm] | 926 | 1 500 | 1 140 | 1 200 |
| Na$^+$ [mM] | 9.5 | 12.9 | 9.1 | 9.2 |
| K$^+$ [mM] | 1.1 | 1.1 | 1.0 | 1.2 |
| Ca$^{2+}$ [mM] | 1.4 | 0.9 | 0.8 | 1.4 |
| Mg$^{2+}$ [mM] | 0.2 | 0.2 | 0.2 | 0.3 |
| Cl$^-$ [mM] | n.a. | 0.7 | 0.5 | 0.7 |
| SO$_4^{2-}$ [mM] | n.a. | 0.4 | 0.4 | 0.4 |

[1]NTU = Nephelometric turbidity uni

In one trial set up the upper liquid phase was also analysed for the wood extractives content and the carbohydrate content. The wood extractives content was determined by extraction of the TMP filtrate with petroleum (Saltsman et al., 1959, Estimation of tall oil in sulphate black liquor, Tappi, 42(11), 873). The GC-FID analysis for the group determination in the wood extractives was performed according to the method of Örsa and Holmbom (Örsa et al., 1994, A convenient method for the determination of wood extractives in papermaking process waters and effluents; J. Pulp. Pap. Sci., 20(12), 361). The samples were hydrolysed with sulphuric acid at 121° C. in an autoclave according to SCAN-CM 71:09. The solubilised monosaccharides were quantified using an ion chromatograph coupled to a pulsed amperometric detector (IC-PAD). The acid insoluble residue was determined gravimetrically and the acid soluble residue (lignin) was measured with UV spectrophotometry at 205 nm and quantified using an absorption coefficient of 110 dm$^3$/(gcm).

The lower sedimented mineral-containing phase was analysed by thermo gravimetric analysis (TGA) on the Mettler Toledo TGA/STDA 851$^e$. The samples were heated from 20 to 1 000° C. with a heating rate of 20° C./min. The weight loss was recorded between 200 and 1 000° C.

2. Minerals

Various mineral powders were tested in this study. On one hand two Finnish talc grades were used as references. One is commercially available talc, Finntalc P05 from Mondo Minerals and the other talc grade is derived from Finntalc P05 with subsequent comminution and delamination to generate fineness, high aspect ratio and enhanced specific surface area. The Finntalc P05 will be labelled as LSA (low surface area) talc and the delaminated quality will be labelled as high surface area (HSA-talc) talc. The specific surface areas and particle sizes of the various mineral powders are reported in the following Table 2.

TABLE 2

| Name | Abbrev. | Type | Specific surface area [m$^2$/g] | d$_{50}$/µm (Sedigraph 5120) | Electrophoretic mobility/×10$^{-8}$ m$^2$/(Vs) |
|---|---|---|---|---|---|
| Finntalc P05 | LSA-talc | Talc | 8.7 | 2.4 | −3.4 |
| Delaminated | HSA- | Talc | 45.0 | 0.8 | −3.9 |

TABLE 2-continued

| Name | Abbrev. | Type | Specific surface area [m$^2$/g] | d$_{50}$/µm (Sedigraph 5120) | Electrophoretic mobility/×10$^{-8}$ m$^2$/(Vs) |
|---|---|---|---|---|---|
| Finntalc P05 | | talc | | | |
| Omyacarb 10 | OMC-10 | Calcium carbonate | 1.3 | n.a. | n.a. |
| Omyacarb 1 | OMC-1 | Calcium carbonate | 3.9 | 1.5 | −1.7 |
| Comminuted Omyacarb 1 | HSA-GCC | Calcium carbonate | 10.2 | 0.6 | n.a. |

The specific surface area, particle size (d$_{50}$) and electrophoretic mobility are determined in a 0.01 M NaCl solution as medium for the suspension of the investigated minerals.

On the other hand various ground calcium carbonate grades were tested. One is commercially available as Omyacarb 10 (OMC-10), another as Omyacarb 1 (OMC-1) and a third quality was produced from OMC-1 by chemical free grinding to obtain a high surface area ground calcium carbonate (HSA-GCC) compared to OMC-1 and OMC-10, which both are low surface area ground calcium carbonates. The ground calcium carbonate samples were supplied by Omya and origin from Avenza, Italy.

The specific surface area was measured by nitrogen adsorption on a Micromeritics Tristar based on the BET adsorption model according to ISO 9277 using nitrogen, following conditioning of the sample by heating at 250° C. for a period of 30 minutes. Prior to such measurements, the sample is filtered within a Buchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached.

The weight median equivalent spherical hydrodynamic particle diameter ($d_{50}$) was measured under sedimentation with a Micromeritics Sedigraph 5120. The sedimentation method is an analysis of sedimentation behaviour in a gravimetric field. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and supersonic.

3. Stearic Acid Treatment

The stearic acid was a high purity grade from Sigma Aldrich. The GCC powder was filled into the MTI mixer (Type M3/1.5) which was heated to 80° C. The powder was stirred for a period of 2.5 min at 3 000 rpm. The stearic acid was added to the pre-heated powder. The amount of stearic acid was calculated according to Eq 1 as defined above to derive a product with a defined coverage factor. The blend was again mixed for 2.5 min at 3 000 rpm. The mixer was opened, the powder manually mixed to ensure even distribution in the mixer and closed again for another 2.5 minutes mixing time at 3000 rpm. During the whole procedure the temperature of the mixer was kept at 80° C.

For the calculation of the surface coverage Eq 2 was used in which $m_{SA}$ is the mass of stearic acid (SA) that has to be added to treat 1 g of calcite with a surface coverage fraction by stearic acid $X_{SA}$. This is calculated with the specific surface area of the mineral $\sigma_M$ obtained via nitrogen adsorption, the molecular weight of stearic acid $Mw_{SA}$, the Avogadro constant $N_A$ and the surface area that is covered by one stearic acid molecule $A_{SA}$ which is 0.26 $nm^2$.

$$m_{SA} = \frac{\sigma_M \cdot Mw_{SA} \cdot X_{SA}}{A_{SA} \cdot N_A} \quad [2]$$

4. Semi-quantitative Wetting Test

Mixtures of water and ethanol were prepared in volume ratios of 100:0, 90:10, 80:20, 70:30, 60:40, 50:50, 40:60, 30:70, 20:80, 10:90 and 0:100. 50 $cm^3$ of each of these mixtures were placed in a 100 $cm^3$ beaker. About 0.5-1.0 g of the powder in question was carefully put on top of the liquid. The wetting behaviour was quantified by the time needed for the powder to be wetted according to the following judgment:

| | |
|---|---|
| 0 | → immediate wetting of the powder (sinks within 30 seconds) |
| 0.25 | → within 5 minutes all of the powder is wetted |
| 0.5 | → after 5 minutes more than 50% of the powder is wetted |
| 0.75 | → after 5 minutes less than 25% of the powder is wetted |
| 1 | → the powder is not wetted within 5 minutes |

B. Results

1. Surface Coverage with Stearic Acid and Pitch Adsorption Ability

For the determination of the degree of surface coverage with stearic acid and its pitch adsorption ability, several samples, namely OMC-10, OMC-1 and HSA-GCC, were treated with 30% and 60% stearic acid (based on surface area) and were studied to screen the influence of the degree of stearic acid treatment and the surface area. For comparison reasons, untreated ground calcium carbonate and LSA talc were also tested.

The TMP filtrate used was sample 1 (sampled in November 2009) which was analyzed as described above in Table 1. The electrophoretic mobility of the particles in the TMP filtrate 1 was found to be $-0.5 \times 10^{-8}$ $m^2/(Vs)$. The EM remained constant within the relevant pH range of 7-8.

It has been found that ground calcium carbonate products with 60% of the surface covered with stearic acid could not be wetted by the TMP filtrate, leading to foam and undefined phases after centrifugation. Thus, no results were obtained for these products. Even with the 30% surface treated samples wetting was a problem. Interestingly, the wetting improved during the experiments, suggesting thus the adsorption of surface active compounds from the TMP filtrate.

The turbidity of the TMP filtrate was clearly reduced as a result of mineral addition (cf. FIG. 1). An increased specific surface area (SSA) further improved the removal efficiency for colloidal material. In the case of the 30% surface covered ground calcium carbonate the turbidity was reduced down to 77% of the original 349 NTU with the OMC-10, down to 41% with the OMC-1 and down to 21% with the HSA-GCC. The treatment with stearic acid increased the efficiency of colloidal pitch adsorption. Both, the surface treated and the surface untreated ground calcium carbonate products reduced the turbidity even more efficiently than the LSA talc, which gave only a reduction of 50%. The observed efficiency can, however, also be caused by an agglomeration process of wood resin droplets. The particle size prior and post adsorption in the liquid phase did slightly decrease.

Figure 2:
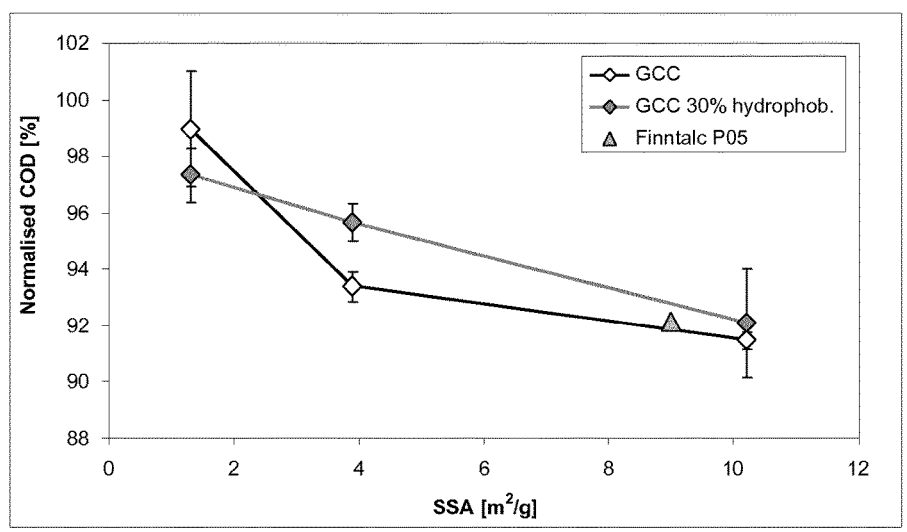
FIG. 2: illustrates the normalised chemical oxygen demand (COD) after the mineral treatment of the TMP filtrate. 100% corresponds to 3 644 mg $O_2/dm^3$.
Figure 3:
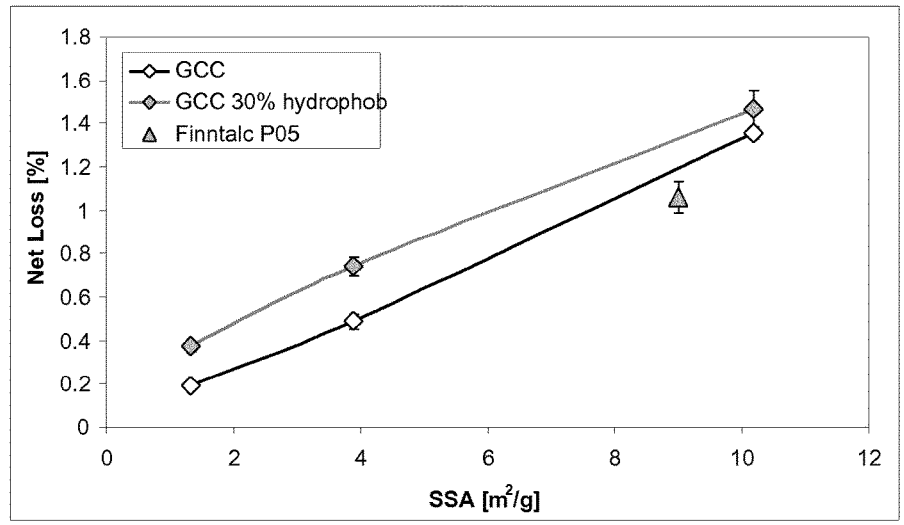
FIG. 3: illustrates the thermo gravimetric analysis of the mineral after the adsorption. The weight fraction lost was recorded between 200 and 1 000° C. and is corrected with the weight loss of the corresponding mineral powder.

Because the size analysis in the liquid phase did not include agglomerates that settled during centrifugation it is also important to consider other analyses like COD (cf. FIG. 2) or TGA (cf. FIG. 3). The COD analysis showed a slightly different trend. On the other hand the values for the OMC-10 as well as both the fatty acid treated HSA-GCC and the untreated HSA-GCC did not show significantly different values. The only difference was observed for the OMC-1 for which, oppositely to turbidity, the untreated ground calcium carbonate was seen to be more efficient. A possible explanation for these contrary observations may be that different species are adsorbed onto treated and untreated ground calcium carbonate powders. In the case of the treated ground calcium carbonate powders, the adsorbable compounds contribute rather to turbidity and are thus of colloidal nature and in the case of the untreated ground calcium carbonate powder the adsorbable species is rather of dissolved nature, contributing preferentially to COD rather than to turbidity. Also the talc powder shows very much the same efficiency as the ground calcium carbonate powders. The analysis of the mineral phase after the adsorption experiment confirmed again the turbidity analysis. The adsorbed amount on the mineral surface increased with the specific surface area. Partially hydrophobised ground calcium carbonate adsorbed slightly more material than native ground calcium carbonate, i.e. not hydrophobised and not surface treated ground calcium carbonate. Both, hydrophobised and native ground calcium carbonate adsorbed more material than talc.

Furthermore, it has been found that the treatment with ground calcium carbonate clearly increased the pH from 7.0 to 7.8. Also the conductivity increased from 926 µS/cm to 980 µS/cm. Very crucial in paper mill water circuits is the calcium ion concentration. Calcium ions can be one of the main contributors to pitch agglomeration. The concentration increased from 1.45 mM to 1.90 mM. The addition of talc had no effect on the calcium ion concentration.

Accordingly, the treatment of the ground calcium carbonate surface with stearic acid is beneficial for pitch adsorption but too much surface treatment with stearic acid can cause wetting problems.

2. The Degree of Surface Coverage with Stearic Acid

It was tried to optimise the amount of stearic acid surface treatment between 0 and 30% surface coverage $X_{SA}$. OMC-1 was used for this optimisation. Again the TMP filtrate 1 was used. The electrophoretic mobility (EM) of the particles in the original TMP filtrate was −0.8×10⁻⁸ m²/(Vs) and no dramatic change of the EM was observed within the relevant pH range (7-8) for this study.

Figure 4:
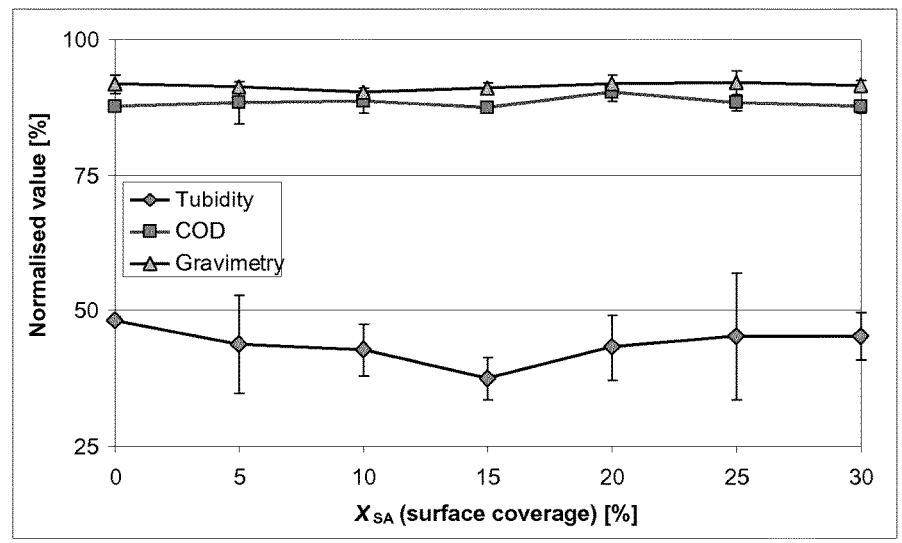
FIG. 4: illustrates the normalised chemical oxygen demand (COD) values, gravimetry and turbidity of a TMP filtrate after an adsorption experiment with the mineral powders against the surface coverage of the mineral powders with stearic acid.
Figure 5:
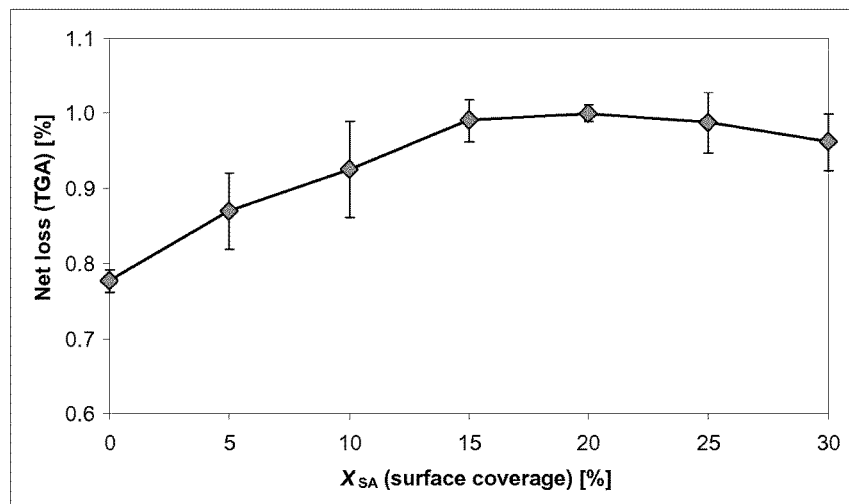
FIG. 5: illustrates the thermo gravimetric analysis of the mineral phase after the adsorption experiments against the surface coverage of the mineral powders with stearic acid. The weight loss of the starting mineral powders (prior the addition to the TMP filtrate) is subtracted (net loss).
Figure 6:
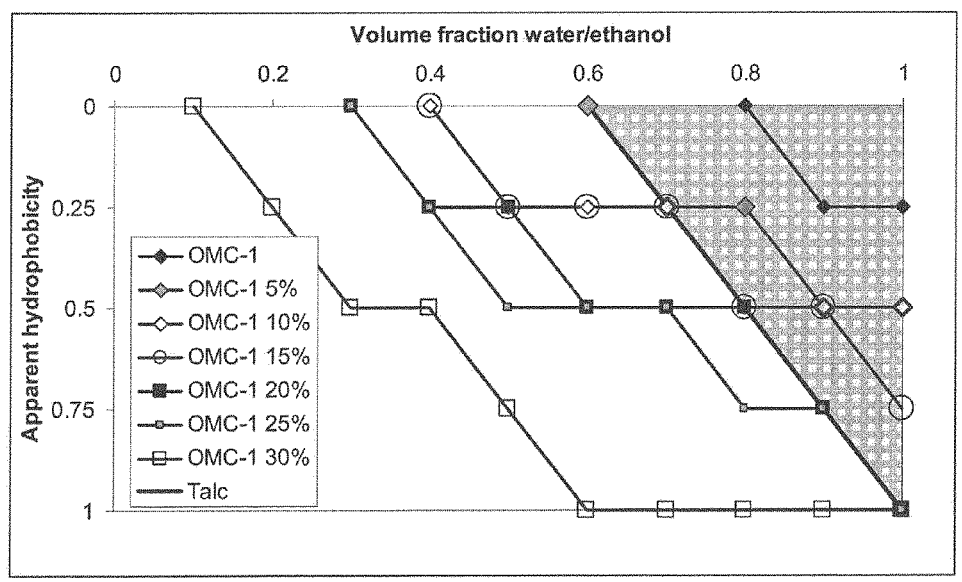
FIG. 6: illustrates the hydrophobicity of the tested mineral powders with their range of stearic acid coverage $X_{SA}$ including also the high surface area (HSA) talc sample. The larger the area on the right side of the line the greater the hydrophobicity. The shaded area reflects the situation for talc.

Already during the trial it was observed that with a higher surface coverage with stearic acid the immersion of the powder into the TMP filtrate was harder and consequently a foamy layer formed. This undefined phase clearly affected the turbidity measurement (cf. FIG. 4). An optimum in turbidity reduction was obtained at 15% surface coverage. From COD and gravimetry measurements one could not distinguish between the different degrees of treatment. The thermo gravimetry measurement (cf. FIG. 5) also showed the optimum dosage to be about 15%. Finally, the semi-quantitative hydrophobicity test (cf. FIG. 6) showed that the sample with about 15% surface coverage had a comparable hydrophobicity to that of talc.

3. Adsorption Isotherm

For further studies the OMC-1 product, with a specific surface area of 3.9 m²/g and a surface coverage with stearic acid of about 15%, was used.

In order to quantify the effect of the stearic acid treatment adsorption isotherms were recorded for an untreated OMC-1 and an OMC-1 with about 15% surface coverage by stearic acid. As a comparison the high surface area talc (HSA talc) was also included. The isotherm was recorded at 24° C. For this work, the TMP filtrate 3 was used providing an electrophoretic mobility of the particles of −0.8×10⁻⁸ m²/(Vs). Within the relevant pH range of 7-8 the EM changed only slightly. The analyses of the TMP filtrate prior to the adsorption experiments are shown in Table 1 above.

An adsorption isotherm presents the loading on the mineral phase in equilibrium ($\Gamma_{eq}^{turb}$) versus the equilibrium concentration in the liquid phase ($c_{eq}^{turb}$), as determined by turbidity, i.e. in this case turbidity was the parameter that contained the information about the equilibrium concentration of colloids. The loading of "turbidity" causing species on the mineral was calculated with the following Eq 3, by subtracting the equilibrium concentration in the liquid phase ($c_{eq}^{turb}$) from the initial turbidity prior to adsorption ($c_0^{turb}$).

$$\Gamma_{eq}^{turb} = \frac{c_0^{turb} - c_{eq}^{turb}}{m_M} \quad [3]$$

Figure 7:
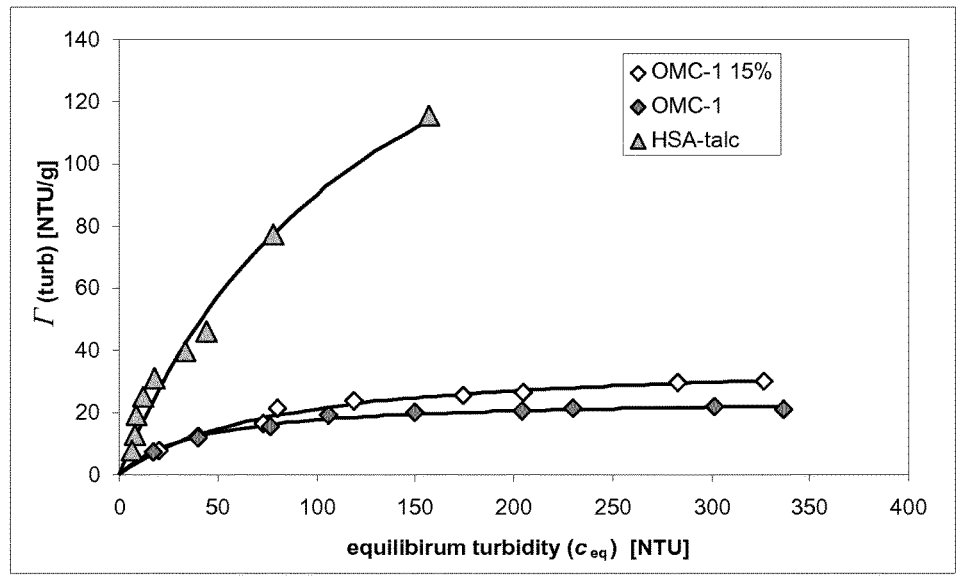
FIG. 7: illustrates the adsorption isotherm based on turbidity data for untreated OMC-1, treated (15% surface coverage) ground calcium carbonate (GCC) and HSA-talc.

The Langmuir adsorption isotherm is given by Eq 4 below. $\Gamma$ is the loading of adsorbate on the adsorbent (mineral) in equilibrium. $c_{eq}$ is the bulk concentration of the adsorbate in equilibrium. The Langmuir constant ($K_L$) indicated that the untreated ground calcium carbonate powder has a higher affinity (0.025 (NTU)⁻¹) for the colloidal material than the partially hydrophobised (0.013 (NTU)⁻¹) (cf. Table 3). The HSA-talc grade had the lowest affinity (0.007 (NTU)⁻¹) with the lowest $K_L$. The maximum loading ($\Gamma_{max}$) increases from the untreated (25 NTU/g) to the treated (37 NTU/g) OMC-1 as can be gathered from the following Table 3 and FIG. 7.

$$\Gamma = \frac{c_{eq} \cdot K_L \cdot \Gamma_{max}}{1 + c_{eq} \cdot K_L} \quad [4]$$

TABLE 3

| Mineral | Parameter | | 95% Confidence limits | |
|---|---|---|---|---|
| Untreated | $K_L$ [(NTU)⁻¹] | 0.025 | 0.019 | 0.032 |
|  | $\Gamma_{max}$ [NTU/g] | 24.9 | 23.0 | 26.0 |
| Treated | $K_L$ [(NTU)⁻¹] | 0.013 | 0.009 | 0.018 |
|  | $\Gamma_{max}$ [NTU/g] | 37.1 | 32.9 | 41.4 |
| HSA talc | $K_L$ [(NTU)⁻¹] | 0.007 | 0.003 | 0.011 |
|  | $\Gamma_{max}$ [NTU/g] | 212.4 | 127.0 | 252.2 |

The adsorption isotherm parameters are based on a non-linear least squares (NLLS) fit to the Langmuir equation (Eq 4) performed by TableCurve® 2D.

The differences between the fitted parameters $K_L$ and $\Gamma_{max}$ are significant. As a result of the high specific surface area of the HSA talc (45 m²/g) the maximum loading of colloidal particles on the talc (212 NTU/g) was proportionally higher, in relation to the specific surface area of the OMC-1, having only about 4 m²/g.

4. Chemical Analysis

For the chemical analysis and agglomeration tests, TMP filtrate 4 was collected which had an electrophoretic mobility of the particles at the original pH of 7.2 of −0.6×10⁻⁸ m²/(Vs). Again, the EM was stable in the relevant pH range of 7-8. The properties of the TMP filtrate 4 are listed in Table 1 above.

In order to cover the relevant regions of the adsorption isotherms, different amounts of mineral were added to the TMP filtrate. In the case of the HSA-talc a talc dosage of 0.4 g/dm³ was provided to represent the region where the dissolved and colloidal substances are in excess and a talc dosage of 4 g/dm³ to represent the region where the talc surface is available in excess. Because the specific surface area of the ground calcium carbonate powders is much lower (cf. Table 2 above) the mineral addition was increased to 8 and 40 g/dm³.

Figure 8:
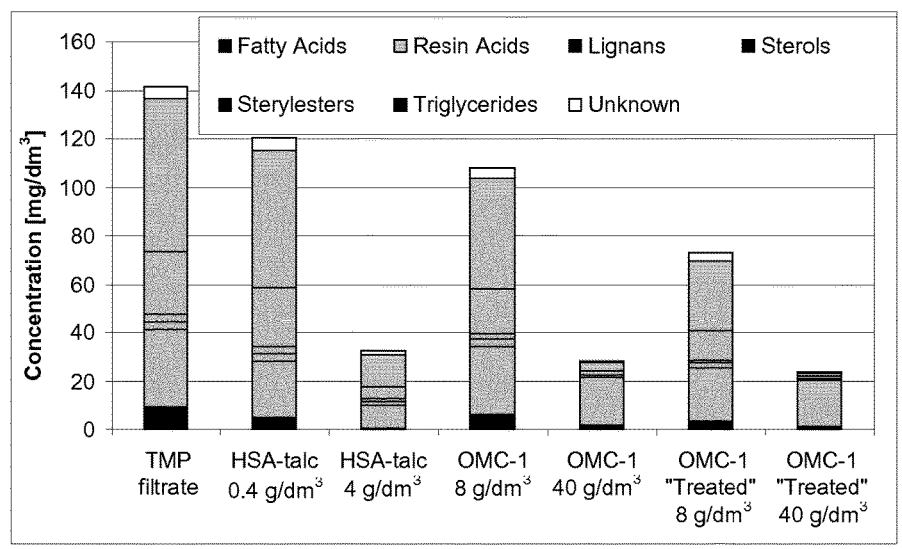
FIG. 8: illustrates the petroleum ether extractives content of the TMP filtrate 4 prior and post adsorption. The extractives are split into the groups: fatty acids, resin acids, lignans, sterols, sterylesters, triglycerides and an unknown fraction.

The petroleum ether extractives content of the TMP filtrate 4 was 142 mg/dm³ as outlined in the following Table 4 and FIG. 8. Table 4 further summarizes the carbohydrate content, acid soluble (lignin) content and acid insoluble content of the TMP filtrate 4 as further described below.

TABLE 4

| Type Extractives | Amount/mg/dm³ |
|---|---|
| Fatty Acids | 9.1 |
| Resin Acids | 32 |
| Lignans | 3.5 |
| Sterols | 2.9 |
| Sterylesters | 26 |
| Triglycerides | 63 |
| Unknown | 5.1 |
| Total: | 142 |
| Carbohydrates | 1 052 |
| Acid soluble (Lignin) | 527 |
| Acid insoluble | 403 |
| Total: | 1 982 |

Figure 9:
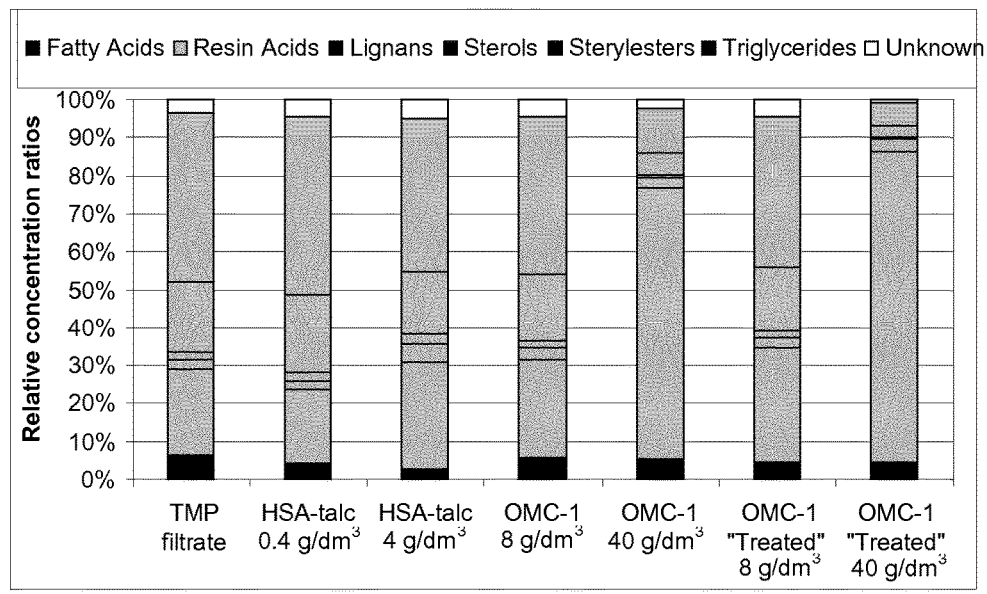
FIG. 9: illustrates the relative composition of the extractives groups in the TMP filtrate prior and post adsorption.

The petroleum ether extractives content of the TMP filtrate 4 is around 4% of the total material in the TMP filtrate. The main constituents of the extractives were triglycerides (44%, triacylglycerides) followed by resin acids (23%) and sterylesters (18%). Free fatty acids (6%), lignans (2%) and sterols (2%) were rather a minor fraction. The remaining 5% is of unknown origin. As can be gathered from FIG. 5, the addition of 0.4 g/dm$^3$ HSA-talc reduced the extractives content to 120 mg/dm$^3$ and the addition of 4 g/dm$^3$ resulted in an extractives content of 32 mg/dm$^3$. The ratio of the extractives groups was in both cases not affected (cf. FIG. 9). The dosage of 8 g/dm$^3$ OMC-1 reduced the extractives content to 107 mg/dm$^3$ and 40 g/dm$^3$ to 28 mg/dm$^3$, respectively. The ratio of the extractives groups was not affected for the low mineral dosage but was strongly affected for the high mineral dosage. A similar picture was observed for the hydrophobised OMC-1 (OMC-1 "Treated"). The lower mineral dosage led to a residual amount of extractives of 73 mg/dm$^3$ and the higher mineral dosage to 23 mg/dm$^3$, respectively.

Figure 10:
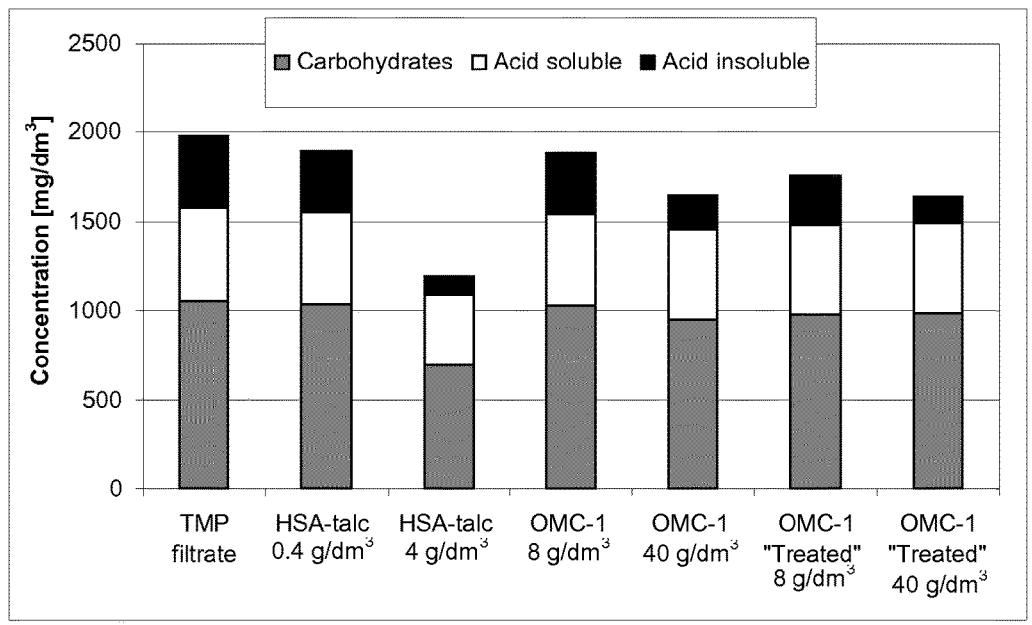
FIG. 10: illustrates the carbohydrate, acid soluble and acid insoluble content in the TMP filtrates prior and post adsorption.

In addition also the water-soluble part of the TMP filtrate was analysed. This analysis is split into three fractions: i) carbohydrates, ii) acid soluble (lignins) and iii) acid insoluble (wood resin, salts etc.). In this respect it is utilized that only the lignin in the acid soluble fraction has its absorption maximum at 280 nm in UV-spectroscopy. Hence, by measuring the UV spectrum one can determine the soluble lignin contained in the acid soluble fraction. The original TMP filtrate 4 contains 1 052 mg/dm$^3$ carbohydrates, 527 mg/dm$^3$ acid soluble (lignin) and 403 mg/dm$^3$ acid insoluble materials (cf. FIG. 10, Table 4). The carbohydrates content during the talc treatment was reduced only slightly (1 034 mg/dm$^3$) for the low talc dosage but a large reduction in the carbohydrates content was observed for the high talc dosage (696 mg/dm$^3$). The untreated OMC-1 adsorbed only a very minor fraction of the carbohydrates. 1 024 mg/dm$^3$ for the low dosage and 952 mg/dm$^3$ for the high OMC-1 dosage, respectively, were measured. Also the hydrophobised OMC-1 adsorbed a very minor amount. For both mineral dosages the carbohydrate content was around 980 mg/dm$^3$. In the case of the acid soluble (lignin) fraction the reduction after the mineral treatment was <3%, except for the HSA-talc with 4 g/dm$^3$. In this case the remaining lignin content was 396 mg/dm$^3$. The acid insoluble fraction, finally, varied proportionally to the extractives reduction.

The pH of the samples increased as a result of the alkaline nature of the mineral powders. The pH for the lower mineral dosages was between 7.3 and 7.6 and for the higher dosages between 7.7 and 7.8.

The calculated ratios between dissolved and colloidal material in the TMP filtrate 4 prior and post adsorption are given in the following Table 5.

TABLE 5

| | Dissolved/Colloidal ratio |
|---|---|
| HSA talc 0.4 g/dm$^3$ | 1.3 |
| HSA talc 4 g/dm$^3$ | 4.4 |
| OMC-1 8 g/dm$^3$ | 1.0 |
| OMC-1 40 g/dm$^3$ | 1.1 |
| OMC1 "Treated" 8 g/dm$^3$ | 1.4 |
| OMC1 "Treated" 40 g/dm$^3$ | 0.8 |

The ratios of the amount of extractives and the amount of carbohydrates plus acid soluble lignin are calculated similar to Eq 2. It can be seen in Table 5 that in the case of high talc dosage (excess of talc surface) the ratio of dissolved to colloidal substances is clearly shifted towards the dissolved fraction (4.4). A possible explanation could be that the pitch droplets adsorb together with their stabilising carbohydrate layer (low mineral dosage), thus, resulting in a constant ratio. After having removed most of the colloidal fraction (high mineral dosage) the talc adsorbs also dissolved materials like carbohydrates, lignins and dissolved wood resin constituents (resin acids, etc), whereas the ground calcium carbonate does not adsorb material from the dissolved fraction. Also the adsorption isotherms for the colloidal substances in the form of the Langmuir constant $K_L$ showed these different adsorption preferences. Talc showed the lowest affinity for the colloidal fraction and the untreated GCC the highest affinity. Interestingly, the affinity of the hydrophobised GCC was in between.

Another observation is that, at high ground calcium carbonate dosages, a substantial amount of resin acids was found in the aqueous phase. A possible explanation could be that the resin acids were dissolved during the adsorption experiment. It is well known that about 20-30 mg/dm$^3$ are dissolved in the pH range of 7 to 8. The pH after the adsorption experiments was measured as being 7.8 for the high mineral dosages. Because the pH before the extraction procedure is acidified, the resin acids will become insoluble again and will be measured as a part of the extractives.

Thus, the effective reduction of colloidal material, i.e. pitch, from the sample is favored by the hydrophobised ground calcium carbonate, whereas the pick-up of dissolved carbohydrates fractions is favored by talc.

Consequently, an especially hydrophobised ground calcium carbonate has been shown to adsorb readily pitch species in the paper making environment. Typical pitch control talc appears to have insufficient surface area to cope with all the probable constituents contained in a pulp. Hydrophobised ground calcium carbonate and/or hydrophobised precipitated calcium carbonate or combinations thereof with talc provide possibilities for synergistic water system treatments as for TMP wood pitch.

The invention claimed is:

1. A process for reducing pitch from paper pulp in an aqueous medium comprising the following steps:
    a) providing an aqueous medium comprising pitch from paper pulp, wherein the pitch is natural resin from the paper pulp, wherein the paper pulp is selected from the group consisting of mechanical pulp, ground wood, TMP (thermo mechanical pulp), chemithermomechanical pulp (CTMP), chemical pulp, and kraft or sulphate pulp, and wherein the pulp is not recycled pulp;
    b) contacting the aqueous medium provided in step a) with calcium carbonate consisting of a partially hydrophobised ground calcium carbonate and/or partially hydrophobised precipitated calcium carbonate so that the calcium carbonate adsorbs pitch in the aqueous medium, wherein the aqueous medium is contacted with 0.05 to 20 wt.-% of the partially hydrophobised ground calcium carbonate and/or the partially hydrophobised precipitated calcium carbonate, based on the total weight of the aqueous medium, wherein the adsorbed pitch is natural resin from the paper pulp, and wherein the partially hydrophobised ground calcium carbonate and/or a partially hydrophobised precipitated calcium carbonate is ground calcium carbonate and/or precipitated calcium carbonate that has been mixed with a hydrophobising agent selected from the group consisting of one or more aliphatic carboxylic acids having between 5 and 24 carbon atoms at a temperature of at least 50° C. such that the hydrophobising agent is in a liquid or molten state and less than 20% of the specific surface area of the ground calcium carbonate and/or the precipitated calcium carbonate is covered by a coating consisting of the hydrophobising agent and reaction products thereof; and c) separating the calcium carbonate with adsorbed pitch from the aqueous medium.

2. The process according to claim 1, wherein the ground calcium carbonate (GCC) is obtained from marble, chalk, calcite, dolomite, limestone or any mixture thereof, and the precipitated calcium carbonate (PCC) is selected from the group consisting of one or more of aragonitic, vateritic and calcitic mineralogical crystal forms.

3. The process according to claim 1, wherein the ground calcium carbonate and/or the precipitated calcium carbonate is in the form of a powder or in the form of slurry.

4. The process according to claim 1, wherein the ground calcium carbonate particles and/or the precipitated calcium carbonate particles have a weight median particle diameter $d_{50}$ value of from 0.1 to 50 µm, measured according to the sedimentation method.

5. The process according to claim 1, wherein the ground calcium carbonate particles and/or the precipitated calcium carbonate particles have a weight median particle diameter $d_{50}$ value of from 0.1 to 25 µm, measured according to the sedimentation method.

6. The process according to claim 1, wherein the ground calcium carbonate particles and/or the precipitated calcium carbonate particles have a weight median particle diameter $d_{50}$ value of from 0.1 to 15 µm, measured according to the sedimentation method.

7. The process according to claim 1, wherein the ground calcium carbonate particles and/or the precipitated calcium carbonate particles have a weight median particle diameter $d_{50}$ value of from 0.5 to 5 µm, measured according to the sedimentation method.

8. The process according to claim 1, wherein the ground calcium carbonate particles and/or the precipitated calcium carbonate particles have a specific surface area of from 0.5 m²/g to 25 m²/g, measured using nitrogen and the BET method.

9. The process according to claim 1, wherein the ground calcium carbonate particles and/or the precipitated calcium carbonate particles have a specific surface area of from 0.5 m²/g to 15 m²/g, measured using nitrogen and the BET method.

10. The process according to claim 1, wherein the ground calcium carbonate particles and/or the precipitated calcium carbonate particles have a specific surface area of from 1 m²/g to 11 m²/g, measured using nitrogen and the BET method.

11. The process according to claim 1, wherein the hydrophobising agent is selected from the group consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid, and any mixture thereof.

12. The process according to claim 1, wherein the hydrophobising agent is selected from the group consisting of octanoic acid, decanoic acid, lauric acid, myristic acid, palmitic acid, stearic acid, arachidic acid, and any mixture thereof.

13. The process according to claim 1, wherein the hydrophobising agent is selected from the group consisting of myristic acid, palmitic acid, stearic acid, and any mixture thereof.

14. The process according to claim 1, wherein the hydrophobising agent comprises a mixture of two aliphatic carboxylic acids having between 5 and 24 carbon atoms, with the proviso that one aliphatic carboxylic acid is stearic acid.

15. The process according to claim 14, wherein one aliphatic carboxylic acid is stearic acid and the other one is selected from the group consisting of octanoic acid, myristic acid, palmitic acid, arachidic acid, behenic acid, and lignoceric acid.

16. The process according to claim 1, wherein the mixing of the ground calcium carbonate and/or the precipitated calcium carbonate with the hydrophobising agent is carried out at a temperature of at least 75 °C.

17. The process according to claim 1, wherein the mixing of the ground calcium carbonate and/or the precipitated calcium carbonate with the hydrophobising agent is carried out at a temperature of between 50 °C and 120 °C.

18. The process according to claim 1, wherein the mixing of the ground calcium carbonate and/or the precipitated calcium carbonate with the hydrophobising agent is carried out at a temperature of between 70 °C and 100 °C.

19. The process according to claim 1, wherein the partially hydrophobised ground calcium carbonate and/or the partially hydrophobised precipitated calcium carbonate is ground calcium carbonate and/or precipitated calcium carbonate in which between 10% and 19% of its specific surface area is covered by a coating consisting of the hydrophobising agent and reaction products thereof.

20. The process according to claim 1, wherein the partially hydrophobised ground calcium carbonate and/or the partially hydrophobised precipitated calcium carbonate is ground calcium carbonate and/or precipitated calcium carbonate in which between 13% and 17% of its specific surface area is covered by a coating consisting of the hydrophobising agent and reaction products thereof.

21. The process according to claim 1, wherein in step b) the aqueous medium is contacted with 0.05 to 10 wt.-% of the partially hydrophobised ground calcium carbonate and/or the partially hydrophobised precipitated calcium carbonate, based on the total weight of the aqueous medium.

22. The process according to claim 1, wherein in step b) the aqueous medium is contacted with 0.1 to 5 wt.-% of the partially hydrophobised ground calcium carbonate and/or the partially hydrophobised precipitated calcium carbonate, based on the total weight of the aqueous medium.

23. The process according to claim 1, wherein the partially hydrophobised ground calcium carbonate and/or the partially hydrophobised precipitated calcium carbonate provided in step b) is in powder form and/or in the form of granules or in the form of slurry.

24. The process according to claim 1, wherein the pH of the pitch containing aqueous medium is adjusted to a value >6 prior to being contacted with the partially hydrophobised ground calcium carbonate and/or the partially hydrophobised precipitated calcium carbonate in step b).

25. The process according to claim 1, wherein the pH of the pitch containing aqueous medium is adjusted to a value >6.5 prior to being contacted with the partially hydrophobised ground calcium carbonate and/or the partially hydrophobised precipitated calcium carbonate in step b).

26. The process according to claim 1, wherein the pH of the pitch containing aqueous medium is adjusted to a value >7 prior to being contacted with the partially hydrophobised ground calcium carbonate and/or the partially hydrophobised precipitated calcium carbonate in step b).

27. The process according to claim 1, wherein the paper pulp is TMP (thermo mechanical pulp).

\* \* \* \* \*